(12) United States Patent
Hata et al.

(10) Patent No.: US 11,820,173 B2
(45) Date of Patent: Nov. 21, 2023

(54) PNEUMATIC TIRE AND PNEUMATIC TIRE MANUFACTURING METHOD

(71) Applicant: The Yokohama Rubber Co., LTD., Tokyo (JP)

(72) Inventors: Hiroshi Hata, Hiratsuka (JP); Hidekazu Ishii, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 125 days.

(21) Appl. No.: 16/626,497

(22) PCT Filed: Apr. 19, 2018

(86) PCT No.: PCT/JP2018/016221
§ 371 (c)(1),
(2) Date: Dec. 24, 2019

(87) PCT Pub. No.: WO2019/017031
PCT Pub. Date: Jan. 24, 2019

(65) Prior Publication Data
US 2020/0122510 A1 Apr. 23, 2020

(30) Foreign Application Priority Data
Jul. 18, 2017 (JP) .................... 2017-139206

(51) Int. Cl.
*B60C 11/00* (2006.01)
*B60C 19/08* (2006.01)
(Continued)

(52) U.S. Cl.
CPC ............ *B60C 11/005* (2013.01); *B60C 19/08* (2013.01); *B29K 2995/0005* (2013.01);
(Continued)

(58) Field of Classification Search
CPC ........... B60C 11/005; B60C 2011/0025; B60C 2011/0033; B60C 19/08; B60C 19/082;
(Continued)

(56) References Cited

U.S. PATENT DOCUMENTS

2005/0087275 A1 4/2005 Zanzig et al.
2006/0021687 A1 2/2006 Dheur et al.
(Continued)

FOREIGN PATENT DOCUMENTS

| CN | 102006989 | 4/2011 |
| CN | 102632774 | 8/2012 |

(Continued)

OTHER PUBLICATIONS

Hiroshi Hata, JP 2016078742, machine translation. (Year: 2016).*
(Continued)

*Primary Examiner* — Galen H Hauth
*Assistant Examiner* — Sedef E Paquette
(74) *Attorney, Agent, or Firm* — Thorpe North & Western

(57) ABSTRACT

Provided is a pneumatic tire including a pair of bead portions; at least one carcass layer extending between the pair of bead portions; a belt layer disposed outward of the carcass layer in a tire radial direction; a tread rubber disposed outward of the belt layer in the tire radial direction; a pair of sidewall rubbers disposed outward of the carcass layer in a tire lateral direction; and an electrically conductive portion extending between the pair of bead portions and having at least one separation portion, the electrically conductive portion having a linear structure, the linear structure including an electrically conductive linear member formed in a linear shape by molding an electrically conductive material with an electrical resistivity of less than $1 \times 10^8$ $\Omega$/cm.

23 Claims, 21 Drawing Sheets

(51) Int. Cl.
B60C 5/14 (2006.01)
B60C 9/20 (2006.01)
B60C 9/28 (2006.01)

(52) U.S. Cl.
CPC .............. *B60C 5/14* (2013.01); *B60C 9/2006* (2013.01); *B60C 9/28* (2013.01); *B60C 2011/0025* (2013.01); *B60C 2011/0033* (2013.01)

(58) Field of Classification Search
CPC ....... B60C 19/084; B60C 19/086; B60C 5/14; B60C 9/2006; B60C 9/28
USPC ...................................... 152/152.1
See application file for complete search history.

(56) References Cited

U.S. PATENT DOCUMENTS

| | | |
|---|---|---|
| 2011/0259489 A1 | 10/2011 | Queraud et al. |
| 2012/0205020 A1 | 8/2012 | Kawakami et al. |
| 2013/0174951 A1 | 7/2013 | Schunack et al. |
| 2015/0328941 A1 | 11/2015 | Hirosue |
| 2016/0257169 A1 | 9/2016 | Kuwayama et al. |
| 2017/0197480 A1 | 7/2017 | Hoshino |
| 2017/0259626 A1* | 9/2017 | Hata ..................... B60C 11/005 |
| 2017/0297383 A1 | 10/2017 | Hatanaka et al. |
| 2018/0339559 A1 | 11/2018 | Kendziorra et al. |

FOREIGN PATENT DOCUMENTS

| | | | | |
|---|---|---|---|---|
| CN | 105682942 | | 6/2016 | |
| CN | 106794719 | | 5/2017 | |
| JP | 2004-268863 | | 9/2004 | |
| JP | 2009-154608 | | 7/2009 | |
| JP | 2010-159017 A | | 7/2010 | |
| JP | 2011-016527 | | 1/2011 | |
| JP | 2013-528525 | | 7/2013 | |
| JP | 2014-133467 | | 7/2014 | |
| JP | 2014-201281 | | 10/2014 | |
| JP | 2015040031 A | * | 3/2015 | |
| JP | 2015107720 A | * | 6/2015 | |
| JP | 2015123900 A | * | 7/2015 | ........... B60C 11/005 |
| JP | 2015-217868 | | 12/2015 | |
| JP | 2016-078742 | | 5/2016 | |
| WO | WO 2009/127323 | | 10/2009 | |
| WO | WO 2011/157473 | | 12/2011 | |
| WO | WO 2014/109169 | | 7/2014 | |
| WO | WO 2015/063972 | | 5/2015 | |
| WO | WO 2016/051651 | | 4/2016 | |
| WO | WO 2017/088994 A1 | | 6/2017 | |

OTHER PUBLICATIONS

Hata H, JP-2015040031-A, machine translation. (Year: 2015).*
Hata H, JP-2015107720-A, machine translation. (Year: 2015).*
International Search Report for International Application No. PCT/JP2018/016221 dated Jul. 3, 2018, 4 pages, Japan.

* cited by examiner

|  | Conventional Example | Comparative Example | Example 1 | Example 2 | Example 3 |
|---|---|---|---|---|---|
| Volume resistivity of cap tread [Ω·cm] | $8.0 \times 10^9$ | $8.0 \times 10^9$ | $8.0 \times 10^9$ | $8.0 \times 10^9$ | $8.0 \times 10^9$ |
| Value of tan δ of cap tread at 60°C | 0.27 | 0.27 | 0.27 | 0.27 | 0.27 |
| Volume resistivity of sidewall rubber [Ω·cm] | $7.0 \times 10^9$ | $7.0 \times 10^9$ | $7.0 \times 10^9$ | $7.0 \times 10^9$ | $7.0 \times 10^9$ |
| Value of tan δ of sidewall rubber at 60°C | 0.22 | 0.22 | 0.22 | 0.22 | 0.22 |
| Volume resistivity of earthing tread [Ω·cm] | - | - | - | - | $4.0 \times 10^6$ |
| Whether electrically conductive portion has separation portion | No | Yes | Yes | Yes | Yes |
| Position of separation portion of electrically conductive portion | - | Side portion | Side portion | Below belt layer | Below belt layer |
| Distance between end portion of separation portion and earthing tread [mm] | - | - | - | - | 60 |
| Electrical resistivity of electrically conductive portion [Ω/cm] | $1.0 \times 10^7$ | $1.0 \times 10^9$ | $1.0 \times 10^7$ | $1.0 \times 10^7$ | $1.0 \times 10^7$ |
| Electrically conductive portion structure | Blended yarn | Blended yarn | Blended yarn | Blended yarn | Blended yarn |
| Volume resistivity coating rubber on carcass layer [Ω·cm] | $1.0 \times 10^7$ | $1.0 \times 10^7$ | $1.0 \times 10^7$ | $1.0 \times 10^7$ | $2.0 \times 10^9$ |
| Total fineness of electrically conductive portion (dtex) | 235 | 235 | 235 | 235 | 235 |
| Elongation ratio of electrically conductive portion (%) | 10 | 10 | 10 | 10 | 10 |
| Rolling resistance reduction performance | 100 | 100 | 100 | 100 | 103 |
| Electrostatic suppression performance (at new) [Ω] | $2.0 \times 10^7$ | $2.0 \times 10^9$ | $4.0 \times 10^7$ | $2.0 \times 10^7$ | $5.0 \times 10^5$ |
| Electrostatic suppression performance (after test run) [Ω] | $5.0 \times 10^9$ | $9.0 \times 10^9$ | $3.0 \times 10^8$ | $5.0 \times 10^7$ | $5.0 \times 10^6$ |

FIG. 21A

| | Example 4 | Example 5 | Example 6 | Example 7 | Example 8 |
|---|---|---|---|---|---|
| Volume resistivity of cap tread [Ω·cm] | $8.0 \times 10^9$ | $8.0 \times 10^9$ | $8.0 \times 10^9$ | $8.0 \times 10^9$ | $8.0 \times 10^9$ |
| Value of tan δ of cap tread at 60°C | 0.27 | 0.27 | 0.27 | 0.27 | 0.27 |
| Volume resistivity of sidewall rubber [Ω·cm] | $7.0 \times 10^9$ | $7.0 \times 10^9$ | $7.0 \times 10^9$ | $7.0 \times 10^9$ | $7.0 \times 10^9$ |
| Value of tan δ of sidewall rubber at 60°C | 0.22 | 0.22 | 0.22 | 0.22 | 0.22 |
| Volume resistivity of earthing tread [Ω·cm] | $4.0 \times 10^6$ | $4.0 \times 10^6$ | $4.0 \times 10^6$ | $4.0 \times 10^6$ | $4.0 \times 10^6$ |
| Whether electrically conductive portion has separation portion | Yes | Yes | Yes | Yes | Yes |
| Position of separation portion of electrically conductive portion | Below belt layer | Below belt layer | Below belt layer | Below belt layer | Below belt layer |
| Distance between end portion of separation portion and earthing tread [mm] | 40 | 40 | 40 | 40 | 40 |
| Electrical resistivity of electrically conductive portion [Ω/cm] | $1.0 \times 10^7$ | $1.0 \times 10^7$ | $1.0 \times 10^7$ | $1.0 \times 10^7$ | $1.0 \times 10^7$ |
| Electrically conductive portion structure | Blended yarn | Mixed intertwined cotton yarn | Mixed intertwined cotton yarn | Mixed intertwined cotton yarn | Mixed intertwined cotton yarn |
| Volume resistivity coating rubber on carcass layer [Ω·cm] | $2.0 \times 10^9$ | $1.0 \times 10^7$ | $2.0 \times 10^9$ | $2.0 \times 10^9$ | $2.0 \times 10^9$ |
| Total fineness of electrically conductive portion (dtex) | 235 | 470 | 470 | 50 | 1200 |
| Elongation ratio of electrically conductive portion(%) | 10 | 10 | 10 | 10 | 10 |
| Rolling resistance reduction performance | 106 | 108 | 106 | 106 | 106 |
| Electrostatic suppression performance (at new)[Ω] | $1.0 \times 10^5$ | $1.0 \times 10^5$ | $1.0 \times 10^5$ | $2.0 \times 10^7$ | $1.0 \times 10^5$ |
| Electrostatic suppression performance (after test run)[Ω] | $1.0 \times 10^6$ | $5.0 \times 10^5$ | $5.0 \times 10^5$ | $3.0 \times 10^8$ | $3.0 \times 10^9$ |

FIG. 21B

| | Example 9 | Example 10 | Example 11 | Example 12 |
|---|---|---|---|---|
| Volume resistivity of cap tread [Ω·cm] | $8.0 \times 10^9$ | $8.0 \times 10^9$ | $8.0 \times 10^9$ | $8.0 \times 10^9$ |
| Value of tan δ of cap tread at 60°C | 0.27 | 0.27 | 0.17 | 0.17 |
| Volume resistivity of sidewall rubber [Ω·cm] | $7.0 \times 10^9$ | $7.0 \times 10^9$ | $7.0 \times 10^9$ | $7.0 \times 10^9$ |
| Value of tan δ of sidewall rubber at 60°C | 0.22 | 0.22 | 0.22 | 0.10 |
| Volume resistivity of earthing tread [Ω·cm] | $4.0 \times 10^6$ | $4.0 \times 10^6$ | $4.0 \times 10^6$ | $4.0 \times 10^6$ |
| Whether electrically conductive portion has separation portion | Yes | Yes | Yes | Yes |
| Position of separation portion of electrically conductive portion | Below belt layer | Below belt layer | Below belt layer | Below belt layer |
| Distance between end portion of separation portion and earthing tread [mm] | 40 | 40 | 40 | 40 |
| Electrical resistivity of electrically conductive portion [Ω/cm] | $1.0 \times 10^7$ | $1.0 \times 10^7$ | $1.0 \times 10^7$ | $1.0 \times 10^7$ |
| Electrically conductive portion structure | Mixed intertwined cotton yarn | Mixed intertwined cotton yarn | Mixed intertwined cotton yarn | Mixed intertwined cotton yarn |
| Volume resistivity of coating rubber on carcass layer [Ω·cm] | $2.0 \times 10^9$ | $2.0 \times 10^9$ | $2.0 \times 10^9$ | $2.0 \times 10^9$ |
| Total fineness of electrically conductive portion (dtex) | 470 | 470 | 470 | 470 |
| Elongation ratio of electrically conductive portion(%) | 5 | 80 | 10 | 10 |
| Rolling resistance reduction performance | 106 | 106 | 112 | 116 |
| Electrostatic suppression performance (at new)[Ω] | $2.0 \times 10^7$ | $1.0 \times 10^5$ | $1.0 \times 10^5$ | $1.0 \times 10^5$ |
| Electrostatic suppression performance (after test run)[Ω] | $3.0 \times 10^8$ | $3.0 \times 10^9$ | $5.0 \times 10^5$ | $5.0 \times 10^5$ |

FIG. 21C

PNEUMATIC TIRE AND PNEUMATIC TIRE MANUFACTURING METHOD

TECHNICAL FIELD

The present technology relates to a pneumatic tire and a method of manufacturing the pneumatic tire, and more particularly to a pneumatic tire capable of providing an electrically conductive portion improved in durability and a method of manufacturing the pneumatic tire.

BACKGROUND ART

Some pneumatic tires in the related art employ an electrostatic suppressing structure using an earthing tread to discharge static electricity produced during traveling on a vehicle to a road surface. Such an earthing tread is an electrically conductive rubber disposed passing through a cap tread and is exposed to a tire ground contact surface. This electrostatic suppressing structure can suppress electrostatic charge in the vehicle by discharging static electricity in the vehicle from a belt layer to the road surface via the earthing tread.

However, in recent years, silica content in rubber compounds constituting cap treads, undertreads, sidewall rubbers, and the like has been increasing for the purpose of improving fuel economy of tires. Silica has high insulating properties, so increase in silica content of a cap tread increases a resistance value of the cap tread to deteriorate electrostatic suppression performance.

Accordingly, some pneumatic tires in the related art include an electrically conductive layer extending in a region from a bead portion to the belt layer to improve the electrostatic suppression performance. Known examples of a pneumatic tire in the related art employing such a configuration include the art described in Japanese Unexamined Patent Publication Nos. 2009-154608, 2013-528525 and 2014-133467, for example. The pneumatic tire described in each of Japanese Unexamined Patent Publication Nos. 2009-154608, 2013-528525 and 2014-133467 includes an electrically conductive portion disposed extending between bead portions positioned on both sides in the tire lateral direction. Accordingly, the electrically conductive portion is disposed continuously from the bead portions to the belt layer, so static electricity generated in a vehicle can flow from the bead portions to the belt layer, and thus can be discharged from the belt layer onto a road surface via an earthing tread.

Here, a pneumatic tire during traveling on a vehicle is subjected to loads from various directions in accordance with traveling conditions of the vehicle, so the pneumatic tire rotates while portions such as a tread portion and a sidewall portion deform. When the pneumatic tire including the electrically conductive portion deforms, the electrically conductive portion also deforms as the tread portion, the sidewall portion, and the like deform. When the electrically conductive portion deforms, the electrically conductive portion deforms while tension acting on the electrically conductive portion changes. When the deformation is repeated, the electrically conductive portion may break due to fatigue caused by repeated deformation, and repeatedly changing tension.

When the electrically conductive portion breaks between the bead portion and the belt layer, electrical resistance between the bead portion and the belt layer increases. Thus, the electrically conductive portion deteriorates in performance of suppressing electrostatic charge of a vehicle. This causes durability of the electrically conductive portion extending continuously from the bead portion to the belt layer to be very difficult to be continuously ensured to continuously maintain the electrostatic suppression performance, regardless of a traveling distance.

SUMMARY

The present technology provides a pneumatic tire capable of providing an electrically conductive portion improved in durability and maintaining electrostatic suppression performance, and a method of manufacturing the pneumatic tire.

A pneumatic tire according to an embodiment of the present technology includes: a pair of bead portions; at least one carcass layer extending between the pair of bead portions; a belt layer disposed outward of the carcass layer in a tire radial direction; a tread rubber disposed outward of the belt layer in the tire radial direction; a pair of sidewall rubbers disposed outward of the carcass layer in a tire lateral direction; and an electrically conductive portion extending between the pair of bead portions and having at least one separation portion, the electrically conductive portion having a linear structure, the linear structure including an electrically conductive linear member formed in a linear shape by molding an electrically conductive material with an electrical resistivity of less than $1 \times 10^8$ Ω/cm.

In the pneumatic tire described above, the separation portion is preferably positioned outside a region between the bead portion and the belt layer.

In the pneumatic tire described above, the electrically conductive portion is preferably disposed continuously between the bead portion and the belt layer in at least one region of regions between the pair of bead portions and the belt layer.

In the pneumatic tire described above, the separation portion is preferably positioned inward of the belt layer in the tire radial direction having a widest width in the tire lateral direction of the belt layer.

In the pneumatic tire described above, the tread rubber preferably includes a cap tread constituting a tire ground contact surface, an undertread layered inward of the cap tread in the tire radial direction, and an earthing tread having an volume resistivity of less than $1 \times 10^8$ Ω·cm, the earthing tread passing through at least the cap tread to be exposed to the tire ground contact surface.

In the pneumatic tire described above, a distance D between an end portion of the separation portion and a position closest to the end portion of the separation portion in the earthing tread preferably satisfies D≤50 mm.

In the pneumatic tire described above, the electrically conductive portion is preferably formed by intertwining a plurality of linear members including at least the one electrically conductive linear member.

In the pneumatic tire described above, the electrically conductive portion is preferably formed by intertwining the electrically conductive linear member having an electrical resistivity of less than $1 \times 10^8$ Ω/cm and a non-electrically conductive linear member having an electrical resistivity of $1 \times 10^8$ Ω/cm or more.

In the pneumatic tire described above, the electrically conductive linear member is preferably a metal fiber, and the non-electrically conductive linear member is preferably an organic fiber.

In the pneumatic tire described above, the electrically conductive portion is preferably disposed sandwiched between the carcass layer and an adjacent member.

In the pneumatic tire described above, coating rubber on the carcass layer preferably has a volume resistivity of $1 \times 10^{\wedge}8$ Ω·cm or more.

In the pneumatic tire described above, the electrically conductive portion preferably has a total fineness of from 20 dtex to 1000 dtex.

In the pneumatic tire described above, the electrically conductive portion preferably has an elongation ratio of from 1.0% to 70.0%.

In the pneumatic tire described above, the tread rubber preferably includes a cap tread constituting a tire ground contact surface, and an undertread layered inward of the cap tread in the tire radial direction, the cap tread having a value of tan δ at 60° C. of 0.25 or less, and the cap tread having a volume resistivity in the range of $1 \times 10^{\wedge}8$ Ω·cm or more.

In the pneumatic tire described above, the sidewall rubber preferably has a value of tan δ at 60° C. of 0.20 or less, and the sidewall rubber has a volume resistivity in the range of $1 \times 10^{\wedge}8$ Ω·cm or more.

In the pneumatic tire described above, the electrically conductive portion preferably intersects carcass cords provided in the carcass layer.

A method of manufacturing a pneumatic tire according to an embodiment of the present technology includes: a first step of extending an electrically conductive portion between a pair of bead portions when assembling a member constituting a pneumatic tire, the electrically conductive portion having a linear structure, the linear structure including an electrically conductive linear member formed in a linear shape by molding an electrically conductive material with an electrical resistivity of less than $1 \times 10^{\wedge}8$ Ω/cm; a second step of making a slit in the electrically conductive portion; and a third step of separating the slit in the electrically conductive portion by lift before vulcanization.

The pneumatic tire and the method of manufacturing a pneumatic tire according to an embodiment of the present technology achieve an effect of enabling improving durability of the electrically conductive portion and maintaining electrostatic suppression performance.

BRIEF DESCRIPTION OF DRAWINGS

FIG. 21A is a table showing results of performance tests of pneumatic tires.

FIG. 21B is a table showing results of performance tests of pneumatic tires.

FIG. 21C is a table showing results of performance tests of pneumatic tires.

DETAILED DESCRIPTION

Hereinafter, a pneumatic tire and a method of manufacturing a pneumatic tire according to an embodiment of the present technology will be described in detail with reference to the drawings. However, the present technology is not limited to the embodiment. Components in embodiments below include a component that can be substituted or easily conceived by one skilled in the art, and components that are essentially identical to each other.

First Embodiment

Pneumatic Tire

Figure 1:
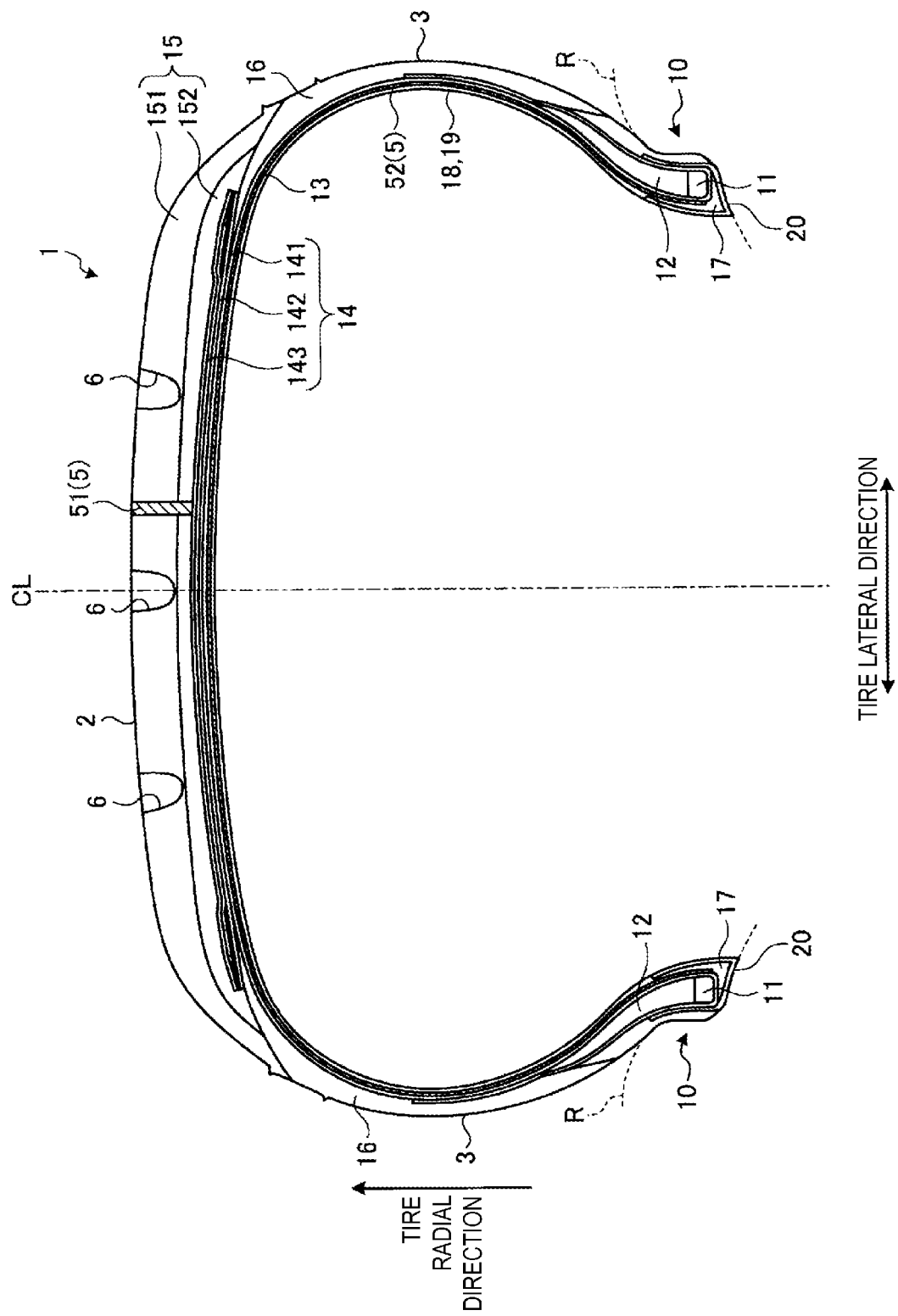
FIG. 1 is a cross-sectional view in a tire meridian direction illustrating a pneumatic tire according to a first embodiment of the technology.

FIG. 1 is a cross-sectional view in a tire meridian direction illustrating a pneumatic tire 1 according to a first embodiment of the technology. FIG. 1 illustrates a cross-sectional view of a half region in the tire radial direction. FIG. 1 also illustrates a radial tire for a passenger vehicle as an example of a pneumatic tire.

In FIG. 1, "cross-section in the tire meridian direction" refers to a cross-section of the tire taken along a plane including a tire rotation axis (not illustrated). Reference sign CL denotes a tire equatorial plane that passes through the center point of the tire in a tire rotation axis direction while being perpendicular to the tire rotation axis. "Tire lateral direction" refers to the direction parallel with the tire rotation axis. "Tire radial direction" refers to the direction perpendicular to the tire rotation axis.

The pneumatic tire 1 has an annular structure with the tire rotation axis as its center, and includes a tread portion 2, a pair of sidewall portions 3, 3, a pair of bead portions 10, 10, a carcass layer 13, a belt layer 14, and an innerliner 18 (refer to FIG. 1). In the pneumatic tire 1, the pair of sidewall portions 3, 3 as well as the pair of bead portions 10, 10 is disposed one by one on both sides across the tire equatorial plane CL in the tire lateral direction.

The pair of bead portions 10, 10 is positioned inward of the corresponding pair of sidewall portions 3, 3 in the tire radial direction. The bead portions 10, 10 each include a bead core 11, a bead filler 12, a rim cushion rubber 17, and a chafer 20. In other words, a pair of the bead cores 11, 11, a pair of the bead fillers 12, 12, a pair of the rim cushion rubbers 17, 17, and a pair of the chafers 20, 20, are disposed on the corresponding sides across the tire equatorial plane CL in the tire lateral direction.

The pair of the bead cores 11, 11 is each an annular member formed by bundling a plurality of bead wires together. The pair of the bead cores 11, 11 constitutes respective cores of the left and right bead portions 10, 10. The pair of the bead fillers 12, 12 is disposed outward of the corresponding pair of the bead cores 11, 11 in the tire radial direction to reinforce the bead portions 10.

The carcass layer 13 has a single layer structure formed of one carcass ply or a multilayer structure formed by layering a plurality of carcass plies, and extends between the bead portions 10, 10 positioned on both sides in the tire lateral direction in a toroidal shape to form a framework of the tire. The carcass ply of the carcass layer 13 is formed by coating a plurality of carcass codes each made of steel or an organic fiber material such as steel, aramid, nylon, polyester, or rayon with coating rubber and performing a rolling process on the carcass codes. The carcass ply of the carcass layer 13 has a carcass angle defined as an inclination angle of the carcass cord in its extension direction from a tire circumferential direction. The carcass angle has an absolute value in the range from 80 degrees to 95 degrees.

For example, FIG. 1 illustrates a structure in which the carcass layer 13 has a single layer structure and continuously extends between the bead cores 11, 11 on both sides in the tire lateral direction. Additionally, both end portions of the carcass layer 13 are turned back outward in the tire lateral direction to wrap around the corresponding bead cores 11 and bead fillers 12, and are fixed. In other words, the carcass layer 13 has portions near both end portions in cross-sectional view taken along the tire meridian direction. The portions pass from inside the corresponding bead cores 11 and bead fillers 12 in the tire lateral direction and in the tire radial direction, and are turned back outward in the tire lateral direction.

The carcass ply of the carcass layer 13 includes the coating rubber on the carcass codes that preferably has a value of tan δ at 60° C. of 0.20 or less, and the coating rubber on the carcass codes preferably has a volume resistivity of $1 \times 10^8$ Ω·cm or more. The coating rubber reduces tire rolling resistance. The coating rubber having such a volume resistivity is made using a compound with low exothermic properties and low carbon content. The coating rubber may be made without using silica, or may be made with silica for reinforcement.

The value of tan δ at 60° C. is measured using a viscoelasticity spectrometer, available from Toyo Seiki Seisaku-sho, Ltd., at an initial distortion 10%, an amplitude of ±0.5%, and a frequency of 20 Hz.

The volume resistivity (volume specific resistivity) is measured in accordance with the method specified in JIS (Japanese Industrial Standard)-K6271, "Rubber, vulcanized or thermoplastic—Determination of volume and surface resistivity". Typically, a member with a volume resistivity in the range less than $1 \times 10^8$ Ω·cm or a surface resistivity in the range less than $1 \times 10^8$ Ω·cm can be considered to have electrical conductivity sufficient to suppress a buildup of static electricity.

The pair of rim cushion rubbers 17, 17 provided in the respective pair of bead portions 10, 10 is disposed radially inward of respective turned back portions of the corresponding bead cores 11, 11 on both sides in the tire lateral direction and the carcass layer 13. Each of the rim cushion rubbers 17, 17 constitutes a contact surface of the bead portion 10 with a rim flange portion of a rim R. The rim cushion rubber 17 preferably has a volume resistivity of $1 \times 10^7$ Ω·cm or less.

The belt layer 14 is formed by layering a pair of cross belts 141, 142 and a belt cover 143 in the tire radial direction, and is disposed radially outward of the carcass layer 13, extending around circumference of the carcass layer 13. The pair of cross belts 141, 142 is formed by coating a plurality of belt codes each made of steel or an organic fiber material with coating rubber and performing a rolling process on the belt codes. The cross belts 141, 142 each have a belt angle, which is an inclination angle of each of the belt codes in its extension direction from the tire circumferential direction, as an absolute value in the range from 20 degrees to 55 degrees. The pair of cross belts 141, 142 each has the belt angle with an opposite sign, and forms a so-called crossply structure in which the cross belts are layered so the belt codes of the respective cross belts intersect each other in their extension directions. That is, the pair of cross belts 141, 142 each has an opposite inclination direction of the belt codes in the tire lateral direction from the tire circumferential direction. The belt cover 143 is formed by performing a rolling process on a plurality of codes made of steel or an organic fiber material, being coated with coating rubber. The belt cover 143 has a belt angle, as an absolute value in the range from 0 degree to 10 degrees. The belt cover 143 is disposed layered outward of the cross belts 141, 142 in the tire radial direction.

The tread portion 2 includes a tread rubber 15 being a rubber composition. The tread portion 2 is disposed radially outward of the carcass layer 13 and the belt layer 14, and is exposed on the outermost side in the tire radial direction of the pneumatic tire 1. Accordingly, the tread portion 2 has a circumferential surface constituting a part of a profile of the pneumatic tire 1. The tread rubber 15 constituting the tread portion 2 includes a cap tread 151 and an undertread 152.

The cap tread 151 is a rubber member that is positioned on the outermost side in the tire radial direction to constitute a tire ground contact surface, and may have a single layer structure (refer to FIG. 1) or a multilayer structure (not illustrated). The cap tread 151 preferably has a value of tan δ at 60° C. of 0.25 or less. In addition, the cap tread 151 preferably has a volume resistivity in the range of $1 \times 10^8$ Ω·cm or more, more preferably in the range of $1\times10^{10}$ Ω·cm or more, and even more preferably in the range of $1\times10^{12}$ Ω·cm or more. The cap tread 151 reduces rolling resistance of the pneumatic tire 1. The cap tread 151 having such a volume resistivity is made using a compound with low exothermic properties and low carbon content, or is made by increasing silica content for reinforcement.

The undertread 152 is a member layered inward in the tire radial direction of the cap tread 151. The undertread 152 preferably has a volume resistivity less than that of the cap tread 151.

The pair of sidewall portions 3, 3 each includes a sidewall rubber 16, and a pair of the sidewall rubbers 16, 16 provided in the respective pair of sidewall portions 3, 3 is disposed outward in the tire lateral direction of the carcass layer 13. The sidewall rubber 16 preferably has a value of tan δ at 60° C. of 0.20 or less. In addition, the sidewall rubber 16 preferably has a volume resistivity in the range of $1\times10^{8}$ Ω·cm or more, more preferably in the range of $1\times10^{10}$ Ω·cm or more, and even more preferably in the range of $1\times10^{12}$ Ω·cm or more. The sidewall rubber 16 reduces the rolling resistance of the pneumatic tire 1. The sidewall rubber 16 having such a volume resistivity is made using a compound with low exothermic properties and low carbon content, or is made by increasing silica content for reinforcement.

While an upper limit value for the volume resistivity of the cap tread 151, a lower limit value for the volume resistivity of the undertread 152, an upper limit value for the volume resistivity of the sidewall rubber 16, and a lower limit value for the volume resistivity of the rim cushion rubber 17 are not particularly limited to the above-mentioned values, the limit values are subject to physical restrictions specific to being a rubber member.

The innerliner 18 is an air permeation preventing layer disposed on a tire inner surface, covering the carcass layer 13. The innerliner 18 also suppresses oxidation caused by exposure of the carcass layer 13 and prevents air in the tire from leaking. In addition, the innerliner 18 is made of a rubber composition with butyl rubber as a main component, thermoplastic resin, thermoplastic elastomer composition made by blending an elastomer component with a thermoplastic resin, and the like, for example. In particular, the innerliner 18 made of a thermoplastic resin or a thermoplastic elastomer composition can be reduced in thickness compared to the innerliner 18 made of butyl rubber, so tire weight can be greatly reduced.

The innerliner 18 preferably has an air permeability coefficient of $100\times10^{-12}$ cc cm/cm$^2$·sec cmHg or less, and more preferably $50\times10^{-12}$ cc cm/cm$^2$·sec cmHg or less, when typically measured in accordance with JIS K7126-1 at a temperature of 30° C. In addition, the innerliner 18 preferably has a volume resistivity in the range of $1\times10^{8}$ Ω·cm or more, and typically that of $1\times10^{9}$ Ω·cm or more.

As a rubber composition composed of mainly butyl rubber, butyl rubber (IIR), butyl-based rubber, or the like can be used. The butyl-based rubber is preferably halogenated butyl rubber such as chlorinated butyl rubber (Cl-IIR) or brominated butyl rubber (Br-IIR).

Examples of a thermoplastic resin that can be used include polyamide resins (nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 9T, nylon 6/6T copolymers, nylon 66/PP copolymers, and nylon 66/PPS copolymers); polyester resins (aromatic polyesters such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester, and polyoxyalkylene diimidic diacid/polybutylene terephthalate copolymers); polynitrile resins (polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); poly (meth)acrylate resins (polymethylmethacrylate (PMMA), polyethylmethacrylate, ethylene ethyl acrylate copolymers (EEA), ethylene acrylate copolymers (EAA), and ethylene methyl acrylate resins (EMA)); polyvinyl resins (vinyl acetate (EVA), polyvinylalcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methylacrylate copolymers); cellulose resins (cellulose acetate and cellulose acetate butyrate); fluorine resins (polyvinylidene fluoride (PVDF), polyvinyl fluoride (PVF), polychlorofluoroethylene (PCTFE), and tetrafluoroethylene/ethylene copolymers (ETFE)); imide resins (aromatic polyimide (PI)); and the like.

Examples of an elastomer that can be used include diene rubbers and hydrogenates thereof (NR, IR, epoxidized natural rubber, SBR, BR (high-cis BR and low-cis BR), NBR, hydrogenated NBR, and hydrogenated SBR); olefin rubbers (ethylene propylene rubber (EPDM, EPM), maleated ethylene propylene rubber (M-EPM); butyl rubber (IIR); isobutylene and aromatic vinyl or diene monomer copolymers; acrylic rubber (ACM); ionomer; halogen-containing rubbers (Br-IIR, Cl-IIR, brominated copolymer of isobutylene/paramethyl styrene (Br-IPMS), chloroprene rubber (CR), hydrin rubber (CHC, CHR), chlorosulfonated polyethylene (CSM), chlorinated polyethylene (CM), and maleated chlorinated polyethylene (M-CM)); silicone rubbers (methyl vinyl silicone rubber, di-methyl silicone rubber, and methyl phenyl vinyl silicone rubber); sulfur-containing rubbers (polysulfide rubber); fluororubbers (vinylidene fluoride rubbers, fluorine-containing vinyl ether rubbers, tetrafluoroethylene-propylene rubbers, fluorine-containing silicone rubbers, and fluorine-containing phosphazene rubbers); thermoplastic elastomers (styrene elastomers, olefin elastomers, polyester elastomers, urethane elastomers, and polyamide elastomers); and the like.

[Electrostatic Suppressing Structure]

Some pneumatic tires in the related art employ an electrostatic suppressing structure using an earthing tread to discharge static electricity produced during traveling on a vehicle to a road surface. The earthing tread is an electrically conductive rubber buried in a tread rubber while being exposed to a tire ground contact surface. This electrostatic suppressing structure can suppress electrostatic charge in the vehicle by discharging static electricity in the vehicle from the belt layer to the road surface via the earthing tread.

However in recent years, as described above, the silica content in rubber compounds constituting cap treads, undertreads, sidewall rubber, and the like has been increasing in order to reduce the tire rolling resistance and thus improve the fuel economy of tires. Silica has high insulating properties, so increase in silica content of a cap tread increases a volume resistance value of the cap tread to deteriorate electrostatic suppression performance.

Then, the pneumatic tire 1 according to the present first embodiment employs the configuration described below to improve electrostatic suppression performance.

Figure 2:
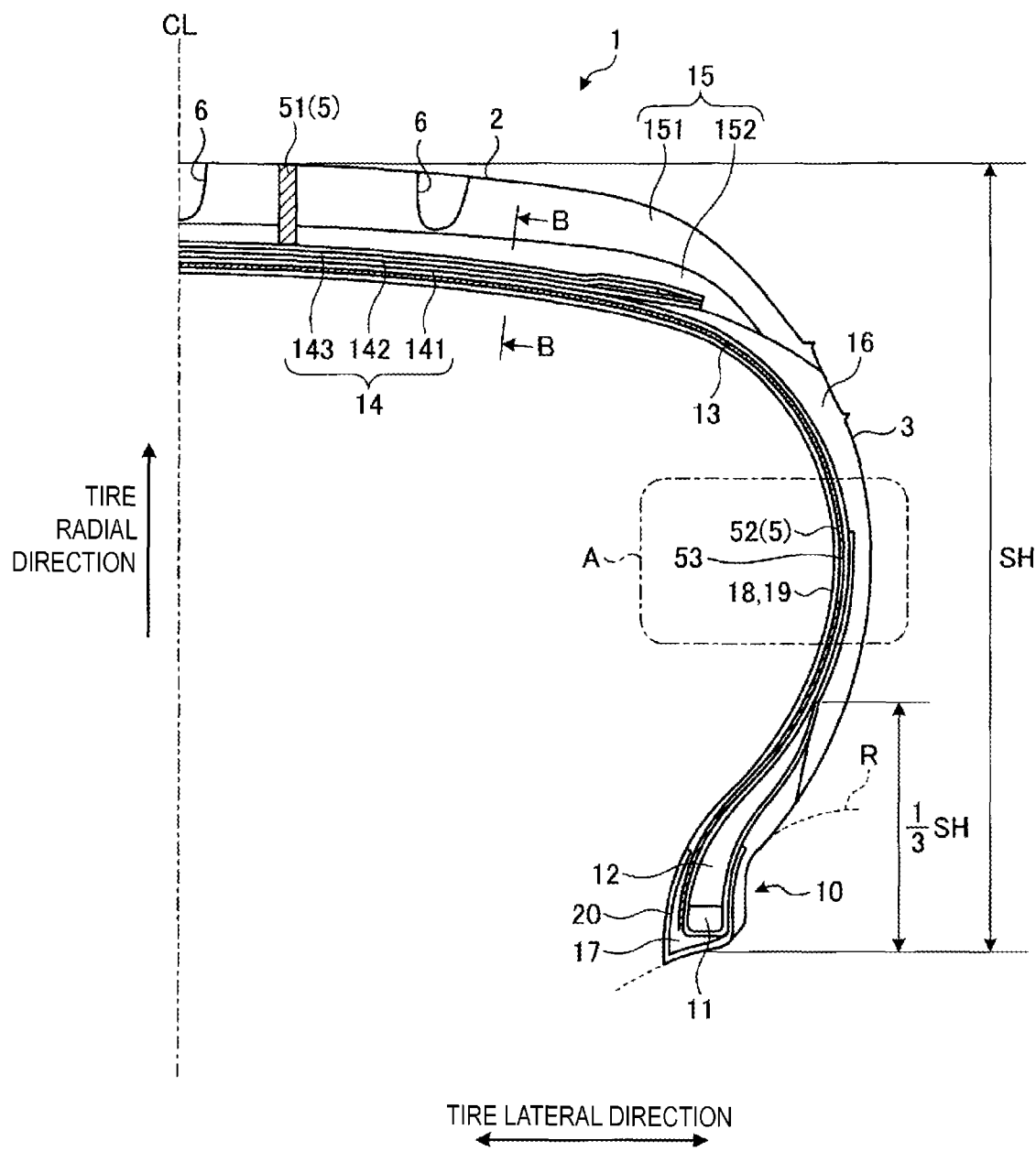
FIG. 2 is a detailed view of a region on one side across a tire equatorial plane in a tire lateral direction of FIG. 1.
Figure 3:
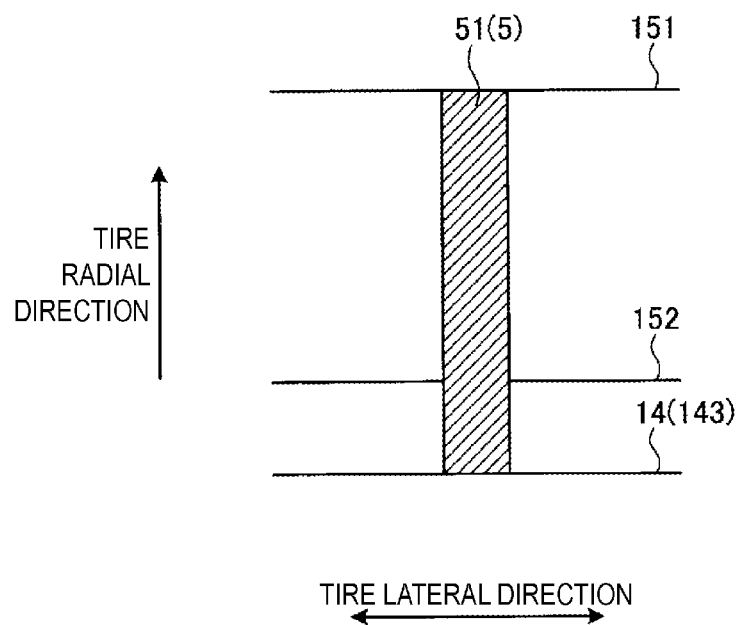
FIG. 3 is a detailed view of an earthing tread illustrated in FIG. 2.

FIG. 2 is a detailed view of a region on one side across the tire equatorial plane CL in the tire lateral direction of FIG. 1. FIG. 3 is a detailed view of an earthing tread 51 illustrated in FIG. 2. In these drawings, the earthing tread 51 and an electrically conductive portion 52 are indicated by hatching.

As illustrated in FIG. 1, the pneumatic tire 1 according to the present first embodiment is provided with the earthing tread 51 and the electrically conductive portion 52 as an electrostatic suppressing structure 5. As illustrated in FIG. 2, the earthing tread 51 is exposed to a road contact surface of the tread rubber 15, and passes through the cap tread 151 and undertread 152 to come into contact with the belt layer 14 in an electrically conductive manner. That is, the earthing tread 51 passes through at least the cap tread 151 and is exposed to the tire ground contact surface. In the present first embodiment, the earthing tread 51 passes through the tread cap tread 151 and the undertread 152, and has a inner end in the tire radial direction coming into contact with the belt cover 143 in an electrically conductive manner. Consequently, an electrically conductive path is secured from the belt layer 14 to the road surface.

In addition, the earthing tread 51 has an annular structure extending around the entire tire circumference, and a part of the earthing tread 51 continuously extends in the tire circumferential direction while being exposed to the tread tire ground contact surface. Thus, when the pneumatic tire 1 is rotated, the earthing tread 51 always comes into contact with a road surface to always ensure an electrically conductive path from the belt layer 14 to the road surface. In the present first embodiment, the earthing tread 51 has a width in the tire lateral direction narrower than a groove width of each of the circumferential main grooves 6 formed extending in the tire circumferential direction in the tread portion 2, and is formed between adjacent circumferential main grooves 6 in the tire lateral direction.

In addition, the earthing tread 51 is made of electrically conductive rubber material having a lower volume resistivity than the tread rubber 15. Specifically, the earthing tread 51 preferably has a volume resistivity of less than $1 \times 10^8$ Ω·cm, and more preferably of $1 \times 10^6$ Ω·cm or less.

As illustrated in FIGS. 1 and 2, the electrically conductive portion 52 has an electrical resistivity of less than $1 \times 10^8$ Ω·cm, and is disposed extending between the pair of bead portions 10, 10 along the carcass layer 13. The electrically conductive portion 52 extending between the pair of bead portions 10, 10 overlaps the belt layer 14 in the tire radial direction at a position outward in the tire radial direction of the belt layer 14, and an inner end portion in the tire radial direction of the electrically conductive portion 52 is positioned near the bead core 11, in contact with the rim cushion rubber 17. Consequently, an electrically conductive path from the electrically conductive portion 52 to the belt layer 14 is ensured, and an electrically conductive path from a rim fitting surface to the electrically conductive portion 52 through the rim cushion rubber 17 is ensured.

The electrically conductive portion 52 extends between the pair of bead portions 10, 10 while including at least one separation portion 53. The separation portion 53 of the electrically conductive portion 52 in the present first embodiment is positioned in one of regions between the respective pair of bead portions 10, 10 and the belt layer 14. That is, the separation portion 53 is positioned in one of the sidewall portions 3, 3 positioned on both sides in the tire lateral direction, and is not formed in the other sidewall portion 3. Accordingly, the electrically conductive portion 52 is continuously disposed in at least one of the regions between the respective pair of bead portions 10, 10 and the belt layer 14 to ensure an electrically conductive path from at least one of the bead portions 10 to the belt layer 14.

In the present first embodiment, the bead portion 10 refers to a region from a measuring position of a rim diameter to a position at one third of a cross-sectional height SH of a tire. The cross-sectional height SH of a tire is a height half of a difference between a tire outer diameter and a rim diameter, measured in an unloaded state when the pneumatic tire 1 is mounted on a specified rim and inflated to a specified internal pressure.

Here, the specified rim refers to an "applicable rim" defined by the Japan Automobile Tyre Manufacturers Association (JATMA), a "Design Rim" defined by the Tire and Rim Association (TRA), and a "Measuring Rim" defined by the European Tyre and Rim Technical Organisation (ETRTO). The specified internal pressure" refers to a "maximum air pressure" defined by JATMA, to a maximum value in "TIRE LOAD LIMITS AT VARIOUS COLD INFLATION PRESSURES" defined by TRA, and to "INFLATION PRESSURES" defined by ETRTO. Additionally, a specified load refers to a "maximum load capacity" defined by JATMA, the maximum value in "TIRE LOAD LIMITS AT VARIOUS COLD INFLATION PRESSURES" defined by TRA, and "LOAD CAPACITY" defined by ETRTO. Then, a passenger vehicle tire is defined in JATMA as follows: the specified internal pressure is an air pressure of 180 kPa; and the specified load is 88% of the maximum load capacity.

Figure 4:
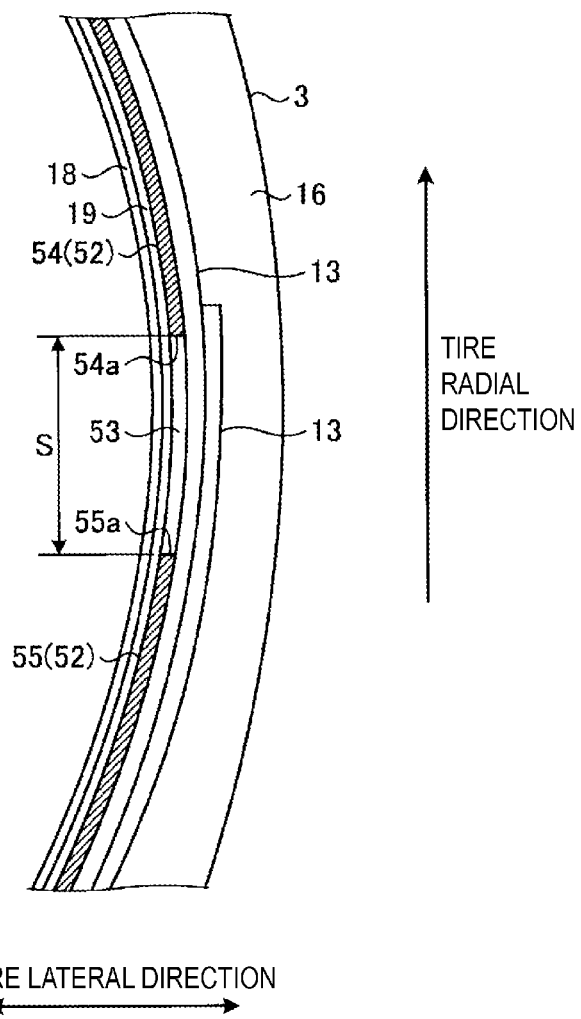
FIG. 4 is a detailed view of portion A of FIG. 2.

FIG. 4 is a detailed view of portion A of FIG. 2. The electrically conductive portion 52 is separated into two members by the separation portion 53, and in the following description, one member separated by the separation portion 53 is referred to as a first member 54, and the other member is referred to as a second member 55. In the first embodiment, the first member 54 extends in the tire radial direction outward from the separation portion 53 in the electrically conductive portion 52, and extends to the bead portion 10 in the sidewall portion 3 opposite to the sidewall portion 3 in which the separation portion 53 is positioned of the sidewall portions 3, 3 on both sides in the tire lateral direction. On the other hand, the second member 55 extends in the tire radial direction inward from the separation portion 53 in the electrically conductive portion 52, and extends to the bead portion 10 in the sidewall portion 3 in which the separation portion 53 is positioned of the sidewall portions 3, 3 on both sides in the tire lateral direction.

The separation portion 53 is formed between an end portion 54a of the first member 54 and an end portion 55a of the second member 55. The separation portion 53 has a separation distance S, i.e., a distance S between the end portion 54a of the first member 54 and the end portion 55a of the second member 55 is in the range S≤100 mm. The separation distance S between the end portion 54a of the first member 54 and the end portion 55a of the second member 55 separated by the separation 53 as described above is preferably in the range S≤60 mm, and more preferably in the range S≤20 mm.

Figure 5:
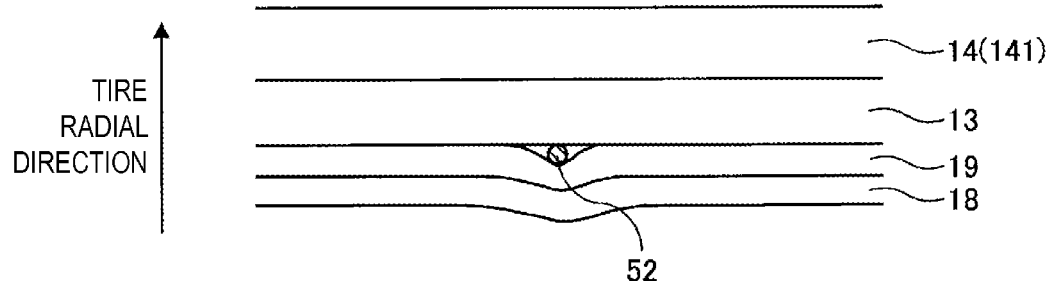
FIG. 5 is a cross-sectional view taken along line B-B of FIG. 2, illustrating an arrangement structure of an electrically conductive portion at a position in a tread portion.
Figure 6:
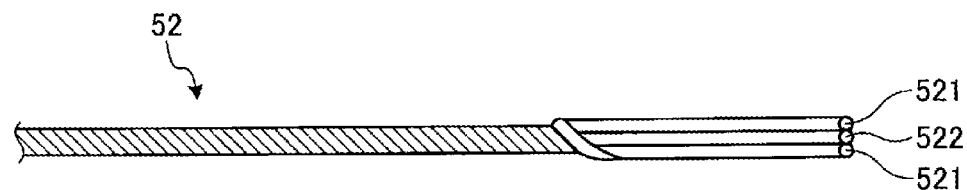
FIG. 6 is an explanatory diagram of only an electrically conductive portion.

FIG. 5 is a cross-sectional view taken along line B-B of FIG. 2, illustrating an arrangement structure of the electrically conductive portion 52 at a position in the tread portion 2. FIG. 6 is an explanatory diagram of only the electrically conductive portion 52. In the drawings, FIG. 5 schematically illustrates a radial cross-sectional view of the belt layer 14 and the electrically conductive portion 52. FIG. 6 illustrates a stranded wire structure of the electrically conductive portion 52.

The electrically conductive portion 52 has a linear structure including an electrically conductive linear member 521.

The electrically conductive portion 52 has a stranded wire structure including an intertwined plurality of linear members including at least one electrically conductive linear member 521. The electrically conductive portion 52 may be a monofilament cord made of an electrically conductive material (not illustrated). The electrically conductive portion 52 having a linear structure is preferable to a configuration with an electrically conductive portion formed by a rubber layer additionally added to a tire due to reduced tire rolling resistance.

The electrically conductive linear member 521 is formed by molding an electrically conductive material having an electrical resistivity of less than $1\times10^8$ Ω/cm, in a linear shape. Thus, the electrically conductive linear member 521 may represent a monofilament, a strand, or a cord itself, made of an electrically conductive material. Accordingly, for example, the electrically conductive linear member 521 may correspond to a cord made of metal or carbon fiber, a metal fiber formed by fiberizing metal such as stainless steel, and the like.

Examples of the stranded wire structure of the electrically conductive portion 52 (refer to FIG. 6) include (1) a structure formed by intertwining a plurality of carbon fibers, and (2) a structure formed by intertwining an electrically conductive linear member 521 having an electrical resistivity of less than $1\times10^8$ Ω/cm and a non-electrically conductive linear member 522 having an electrical resistivity of $1\times10^8$ Ω/cm or more, for example. The stranded wire structure of the linear members is not limited to any particular structure, and any structure can be applied.

As the non-electrically conductive linear member 522 in the structure (2) described above, polyester fiber, nylon fiber, and the like can be used, for example. In particular, the electrically conductive portion 52 is preferably a blended yarn formed by intertwining the electrically conductive linear member 521 made of metal fiber and the non-electrically conductive linear member 522 made of such as polyester fiber.

The electrical resistivity Ω/cm is measured as follows: a sample piece having a length of 3 cm or more is taken from of a fiber in its longitudinal direction; a voltage of 500 V is applied across the sample piece (between both ends); and measurement is performed using ohmmeter SME-8220 available from Toa Dempa Kogyo K. K in a measurement environment in which temperature is 20° C. and humidity is 20% RH.

The electrically conductive portion 52 preferably has a total fineness in the range from 20 to 1000 dtex, and more preferably in the range from 150 to 350 dtex. Setting a lower limit of the total fineness to a value within the range described above ensures that the electrically conductive portion 52 is prevented from breaking during manufacturing of a tire. In addition, setting an upper limit of the total fineness to a value within the range described above ensures that the electrically conductive portion 52 is prevented from breaking during rolling of the tire.

The total linear density is measured in accordance with JIS L1017 (Test methods for chemical fiber tire cords, 8.3 Fineness based on corrected weight).

The electrically conductive portion 52 preferably has an elongation ratio, i.e., an elongation in the range from 1.0% to 70.0%. When the elongation is set to 1.0% or more, breaking of the electrically conductive portion 52 during manufacturing of the tire is prevented. When the elongation is set to 70.0% or less, breaking of the electrically conductive portion 52 during rolling of the tire is prevented.

The elongation of the linear members is measured in accordance with JIS L1017 (Test methods for chemical fiber tire cords, 8.5 Tensile strength and Elongation ratio).

In the present first embodiment, the electrically conductive portion 52 is yarn, and is disposed sandwiched between the carcass layer 13 and an adjacent member. As illustrated in FIG. 6, the electrically conductive portion 52 has a stranded wire structure formed by intertwining the electrically conductive linear member 521 having an electrical resistivity of less than $1\times10^8$ Ω/cm and the non-electrically conductive linear member 522 having an electrical resistivity of $1\times10^8$ Ω/cm or more.

The yarn is a linear member disposed along a surface of the carcass layer 13 (refer to FIG. 5), and has a function of forming a minute gap between the carcass layer 13 and the adjacent member for discharging enclosed air in a step of molding a green tire.

For example, as illustrated in FIGS. 2 and 5, the electrically conductive portion 52 according to the present first embodiment is positioned on an inner peripheral surface side of the carcass layer 13, and disposed sandwiched between a tie rubber 19, and the carcass layer 13 and the innerliner 18.

In such a case, a distance between the electrically conductive portion 52 and the innerliner 18 is preferably 1.0 mm or less, and more preferably 0.5 mm or less. In particular, when the innerliner 18 is made of thermoplastic resin, static electricity is produced by friction during rolling of the tire to cause the innerliner 18 to be electrically charged. Thus, when the electrically conductive portion 52 is disposed close to the innerliner 18, an electrically conductive path from the innerliner 18 to the electrically conductive portion 52 is appropriately ensured.

Figure 7:
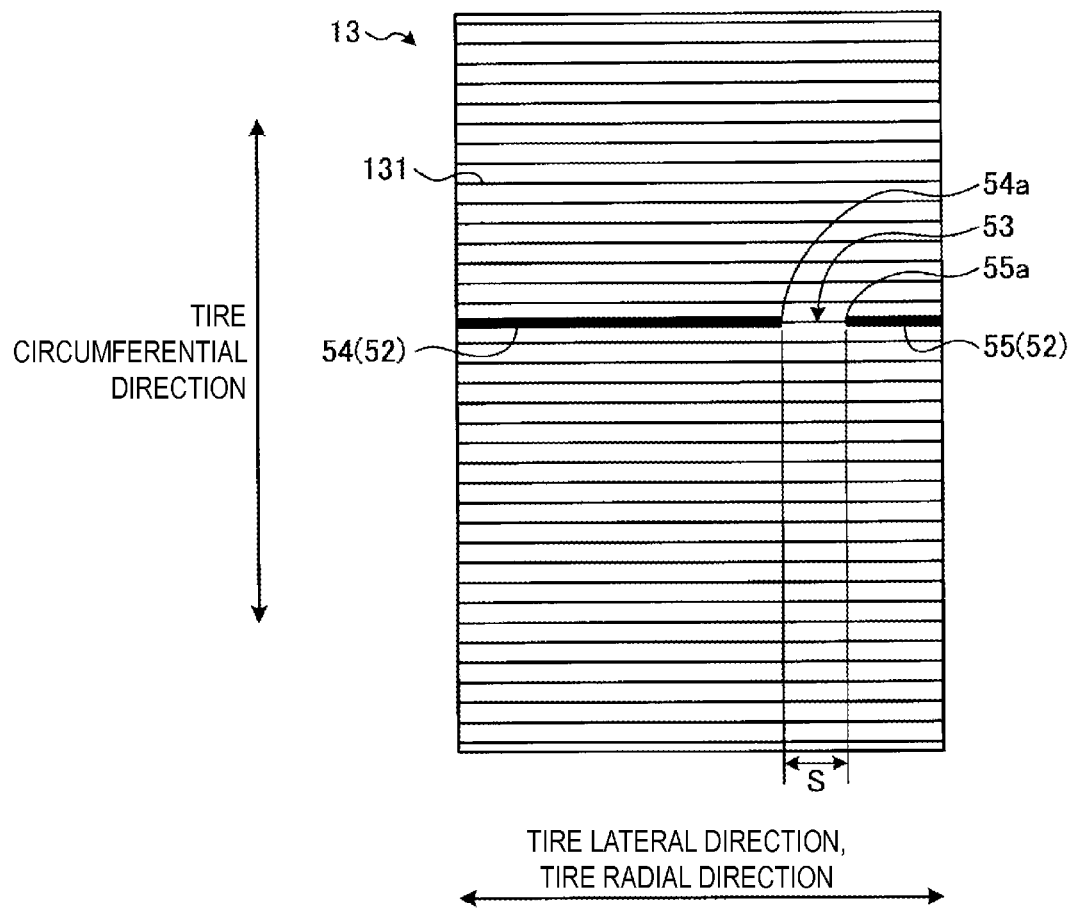
FIG. 7 is a schematic view illustrating a state of spreading the carcass layer illustrated in FIG. 1, and is an explanatory diagram illustrating a relationship between carcass cords and an electrically conductive portion.

FIG. 7 is a schematic view illustrating a state of spreading the carcass layer 13 illustrated in FIG. 1, and is an explanatory diagram illustrating a relationship between carcass cords 131 and the electrically conductive portion 52. The carcass cords 131 provided in the carcass layer 13 are inclined from the tire circumferential direction in the range from 80 degrees to 95 degrees, and the electrically conductive portion 52 extends in the direction along the carcass cords 131 of the carcass layer 13. In other words, the electrically conductive portion 52 is disposed in a direction substantially parallel to the carcass cords 131. The electrically conductive portion 52 disposed substantially parallel to the carcass cords 131 as described above preferably has an angle to the carcass cords 131 in the range of 30 degrees or less.

In the pneumatic tire 1 according to the first embodiment, when the electrostatic suppressing structure 5 is formed as described above, a path from the rim R to the earthing tread 51 through the rim cushion rubber 17, the electrically conductive portion 52, and the belt layer 14 can be used as an electrically conductive path for discharging static electricity from a vehicle to a road surface.

The rim cushion rubber 17, the coating rubber on the carcass layer 13 and the belt layer 14 constitute the electrically conductive path from the rim R to the earthing tread 51. Thus, these rubbers are each preferably set to have a low volume resistivity. Accordingly, electrically conductive efficiency from the rim R to the earthing tread 51 is improved.

The pneumatic tire 1 according to the present first embodiment is configured such that the electrically conductive portion 52 has an end portion inward in the tire radial direction extending to the vicinity of the bead core 11, in contact with the rim cushion rubber 17. Such a configuration is preferable because the electrically conductive path from the rim fitting surface to the electrically conductive portion 52 through the rim cushion rubber 17 is appropriately ensured.

Besides this, as illustrated in FIG. 7, the end portion inward in the tire radial direction of the electrically conductive portion 52 may extend to the inside of the bead core 11 in the tire radial direction, which is not illustrated. The end portion inward in the tire radial direction of the electrically conductive portion 52 may be disposed turned up around the bead core 11, which is not illustrated. These configurations further improve electrical conductivity from the rim fitting surface to the electrically conductive portion 52. The end portion inward in the tire radial direction of the electrically conductive portion 52 may terminate in the vicinity of the bead filler 12, for example, without coming into contact with the rim cushion rubber 17, which is not illustrated. Such a configuration also ensures necessary and sufficient electrical conductivity from the rim fitting surface to the electrically conductive portion 52. Alternatively, the end portion inward in the tire radial direction of the electrically conductive portion 52 may be exposed to the surface of the pneumatic tire 1 and disposed in direct contact with the rim R, which is not illustrated. Such a configuration enables the electrical conductivity from the rim R to the electrically conductive portion 52 to be further improved.

[Method of Manufacturing Pneumatic Tire]

Figure 8:
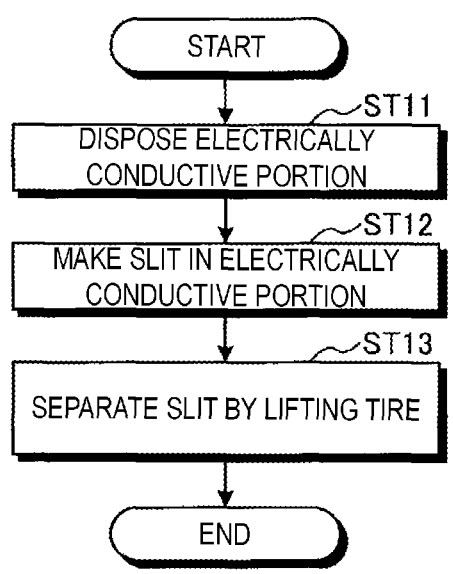
FIG. 8 is a flowchart illustrating some steps of a method of manufacturing a pneumatic tire according to the first embodiment.

Next, a method of manufacturing the pneumatic tire 1 according to the first embodiment will be described. FIG. 8 is a flowchart illustrating some steps of the method of manufacturing the pneumatic tire 1 according to the first embodiment. When the pneumatic tire 1 is manufactured, first, each of members constituting the pneumatic tire 1 is processed, and the processed members are assembled. Specifically, rubber members such as the tread rubber 15 and the sidewall rubber 16, and members such as the bead core 11, the carcass layer 13, and the belt layer 14, are each processed, and the processed members are assembled.

At this time, the electrically conductive portion 52 is disposed extending between the pair of bead portions 10, 10 (step ST11, first step). In other words, when each of the members constituting the pneumatic tire 1 is assembled, the electrically conductive portion 52 is extended along the carcass layer 13 between the pair of bead portions 10, 10 or between vicinities of the respective pair of bead cores 11, 11. The electrically conductive portion 52 is used in the pneumatic tire 1 according to the first embodiment and has a linear structure. The linear structure includes the electrically conductive linear member 521 formed by molding an electrically conductive material having an electrical resistivity of less than $1 \times 10^8$ Ω/cm in a linear shape.

Next, the electrically conductive portion 52 is slit (step ST12, second step). In other words, while the electrically conductive portion 52 is disposed extending between the pair of bead portions 10, 10, the electrically conductive portion 52 is slit at a position at which the separation portion 53 is to be formed. In the pneumatic tire 1 according to the first embodiment, the separation portion 53 is formed in one region of regions between the respective bead portions 10, 10 positioned on both sides in the tire lateral direction and the belt layer 14, so the electrically conductive portion 52 is slit in the one region between the bead portion 10 and the belt layer 14.

In this case, the slit in the electrically conductive portion 52 may be formed by completely slitting the electrically conductive portion 52, or by incompletely slitting it in a state of a portion remaining connected.

Next, the slit is separated by lifting the tire (step ST13, step 3). The lift of the tire in this case includes both lift during molding of a green tire and lift of the green tire during vulcanization. Then, the lift of the green tire during molding is a step of expanding the green tire from its inside in the tire radial direction to its outside and outside in the tire lateral direction using a molding machine after each of the members constituting the pneumatic tire 1 is assembled. The lift of the green tire during vulcanization is a step of expanding the green tire from its inside in the tire radial direction to its outside and its outside in the tire lateral direction using a bladder after the green tire is placed in a mold for vulcanization molding and the bladder is placed radially inside the green tire.

The electrically conductive portion 52 is subjected to tension in its extension direction by lifting a tire with each of the members assembled before molding of the green tire, or the green tire during vulcanization, so the electrically conductive portion 52 is separated across the slit. In other words, when the electrically conductive portion 52 is cut completely by slitting the electrically conductive portion 52, end portions of the cut portions are separated in a direction away from each other by the tension acting on the electrically conductive portion 52. In addition, when the electrically conductive portion 52 is cut incompletely with a portion remaining connected by slitting the electrically conductive portion 52, the portion remaining connected is cut by the tension acting on the electrically conductive portion 52, and then end portions of the cut portions are separated in a direction away from each other. When each of the members constituting the pneumatic tire 1 is assembled to form the green tire, a slit is formed in the electrically conductive portion 52 disposed extending between the pair of bead portions 10, 10. Then, end portions of the slit are separated from each other by the lift before vulcanization, as described above. Accordingly, the separation portion 53 is formed in the electrically conductive portion 52.

[Functions and Effects]

When a vehicle mounted with the pneumatic tire 1 according to the first embodiment travels, the pneumatic tire 1 rotates while a surface of the pneumatic tire 1 in a portion positioned downward in the tread portion 2, facing a road surface, comes into contact with the road surface. When the surface in the tread portion 2 sequentially comes into contact with the road surface as described above, friction force can be generated between the pneumatic tire 1 and the road surface. Accordingly, the vehicle can transfer driving force, braking force, and turning force to the road surface using the frictional force between the pneumatic tire 1 and the road surface, and can travel using the driving force, the braking force, and the turning force.

Static electricity may be generated during traveling of the vehicle, and such static electricity flows from the rim R into the earthing tread 51 through the rim cushion rubber 17, the electrically conductive portion 52, and the belt layer 14, and is discharged from the earthing tread 51 to the road surface. Accordingly, the static electricity generated on the vehicle is discharged to the road surface, so electrostatic charge on the vehicle due to the static electricity is suppressed.

During traveling of the vehicle, the pneumatic tire 1 rotates while the tread portion 2, the sidewall portion 3, and the like deform due to loads generated in accordance with the traveling state of the vehicle. Accordingly, the electrically conductive portion 52 disposed between the pair of bead portions 10, 10 also deforms as the tread portion 2, the sidewall portion 3, and the like deform. The electrically conductive portion 52 has a linear structure including the electrically conductive linear member 521. Repeated deformation of the electrically conductive portion 52 may cause the electrically conductive portion 52 to break due to fatigue caused by repeated deformation, and repeatedly changing tension.

When the electrically conductive portion 52 breaks, the electrically conductive path from the rim R to the earthing tread 51 is broken. Thus, while the static electricity generated in the vehicle is less likely to be discharged to the road surface, the electrically conductive portion 52 includes the separation portion 53. Accordingly, even when large tension acts on the electrically conductive portion 52, the separation distance S of the separation portion 53, i.e., a distance between the end portion 54a of the first member 54 and the end portion 55a of the second member 55 can change. The change in the separation distance S of the separation portion 53 can suppress excessive increase in tensile stress on the electrically conductive portion 52. Thus, the electrically conductive portion 52 can be prevented from breaking due to large tension acting on the electrically conductive portion 52 or repeated acting of tension thereon, so conductivity by the electrically conductive portion 52 can be maintained even when a traveling distance of the new pneumatic tire 1 after beginning of use is increased. As a result, the electrically conductive portion 52 can be improved in durability, and the electrostatic suppression performance of suppressing electrostatic charge on a vehicle can be maintained.

The electrically conductive portion 52 is disposed continuously between the bead portion 10 and the belt layer 14 in at least one region of the regions between the respective pair of bead portions 10, 10 and the belt layer 14, so the electrically conductive path from the rim R to the earthing tread 51 can be more reliably ensured. That is, the electrically conductive portion 52 disposed in at least one sidewall portion 3 of the sidewall portions 3, 3 positioned on both sides in the tire lateral direction is disposed continuously from the bead portion 10 to the belt layer 14 without the separation portion 53. Accordingly, the electrically conductive portion 52 can ensure the electrically conductive path between the bead portion 10 and the belt layer 14 in the sidewall portion 3 without the separation portion 53, so the electrically conductive path between the bead portion 10 and the belt layer 14 in at least one region of the regions between the respective bead portions 10, 10 on both sides in tire lateral direction and the belt layer 14 can be more reliably ensured. As a result, the electrostatic suppression performance can be more reliably ensured while the electrically conductive portion 52 is improved in durability.

The earthing tread 51 has a volume resistivity of less than $1\times10^8$ Ω/cm, and is exposed to the tire ground contact surface by passing through at least the cap tread 151, so an electrically conductive path from the belt layer 14 to the road surface can be ensured by the earthing tread 51. Accordingly, the electrically conductive pathway from the electrically conductive portion 52 to the road surface can be ensured, and the electrically conductive pathway from the rim R to the earthing tread 51 can be more reliably ensured. Thus, electrical resistance between the rim R and the road surface can be more reliably reduced. As a result, the electrostatic suppression performance can be more reliably ensured.

The electrically conductive portion 52 is formed by intertwining a plurality of linear members including at least one electrically conductive linear member 521, so strength of the electrically conductive portion 52 can be ensured while a desired electrical resistivity is ensured. In other words, when the electrically conductive portion 52 is configured to have a stranded wire structure of a plurality of linear members, strength against repeated fatigue and elongation can be improved compared to a configuration in which the electrically conductive portion 52 is a single wire. As a result, the electrically conductive portion 52 can be improved in durability more reliably while electrostatic suppression performance is ensured.

The electrically conductive portion 52 is formed by intertwining the electrically conductive linear member 521 having an electrical resistivity of less than $1\times10^8$ Ω/cm and a non-electrically conductive linear member 522 having an electrical resistivity of $1\times10^8$ Ω/cm or more. Thus, a weak point of the electrically conductive portion 52 can be compensated by the non-electrically conductive linear member 522 while a desired electrical resistivity is ensured. As a result, strength, heat resistance, and dimensional stability of the electrically conductive portion 52 can be appropriately ensured, so the electrically conductive portion 52 can be more reliably improved in durability.

The electrically conductive linear member 521 is a metal fiber and the non-electrically conductive linear member 522 is an organic fiber, so strength, heat resistance, and dimensional stability of the electrically conductive portion 52 can be more reliably ensured. As a result, the electrically conductive portion 52 can be more reliably improved in durability.

Additionally, the electrically conductive portion 52 is disposed sandwiched between the carcass layer 13 and adjacent members like the innerliner 18 and the tie rubber 19, for example, so the electrically conductive portion 52 can be embedded inside the tire. Accordingly, as compared to a configuration in which the electrically conductive portion 52 is exposed to the tire surface, the electrically conductive portion 52 can be prevented from breaking at a position unnecessary during manufacturing of the tire or during use of the tire. As a result, the electrostatic suppression performance can be more reliably ensured.

The coating rubber on the carcass layer 13 has a volume resistivity of $1\times10^8$ Ω/cm or more, so the carbon content in the coating rubber can be reduced. As a result, heat generation of the coating rubber during rolling of the tire can be suppressed, so the rolling resistance of the pneumatic tire 1 can be reduced.

The electrically conductive portion 52 has a total fineness of from 20 dtex and 1000 dtex, so the electrically conductive portion 52 can have an appropriate total fineness. In other words, when the electrically conductive portion 52 has a total fineness of 20 dtex or more, the electrically conductive portion 52 can be prevented from breaking during manufacturing of the tire. In addition, when the electrically conductive portion 52 has a total fineness of 1000 dtex or less, the electrically conductive portion 52 can be prevented from breaking during rolling of the tire.

The electrically conductive portion 52 has an elongation ratio of from 1.0% to 70.0%, so the electrically conductive portion 52 can have an appropriate elongation ratio. In other words, when the electrically conductive portion 52 has an elongation ratio of 1.0% or more, the electrically conductive portion 52 can be prevented from breaking during manufacturing of the tire. In addition, when the elongation ratio is 70.0% or less, the electrically conductive portion 52 can be prevented from breaking during rolling of the tire.

The cap tread 151 has a value of tan δ at 60° C. of 0.25 or less, and the cap tread 151 has a volume resistivity in the range of $1\times10^8$ Ω/cm or more. Then, increase in silica content of the cap tread 151, for example, enables the values to fall within the ranges. Accordingly, the rolling resistance of the pneumatic tire 1 can be reduced.

The sidewall rubber 16 has a value of tan δ at 60° C. of 0.20 or less, and the sidewall rubber 16 has a volume resistivity in the range of $1 \times 10^{\wedge}8$ Ω/cm or more. Then, increase in silica content of the sidewall rubber 16, for example, enables the values to fall within the ranges. Accordingly, the rolling resistance of the pneumatic tire 1 can be reduced.

A method of manufacturing the pneumatic tire 1 according to the first embodiment includes: a first step of extending the electrically conductive portion 52 between the pair of bead portions 10, 10 when the members constituting the pneumatic tire 1 are assembled; a second step of making a slit in the electrically conductive portion 52, and a third step of separating the slit in the electrically conductive portion 52 by lift before vulcanization, so the electrically conductive portion 52 can be easily and reliably formed with the separation portion 53. As a result, the electrically conductive portion 52 can be improved in durability and the electrostatic suppression performance can be maintained.

Second Embodiment

While a pneumatic tire 1 according to a second embodiment has a configuration substantially similar to that of the pneumatic tire 1 according to the first embodiment, the pneumatic tire 1 has a feature in that a separation portion 53 of an electrically conductive portion 52 is positioned in a range in which a belt layer 14 is disposed. Other configurations are similar to those of the first embodiment, so descriptions thereof will be eliminated and the same reference numerals are used.

Figure 9:
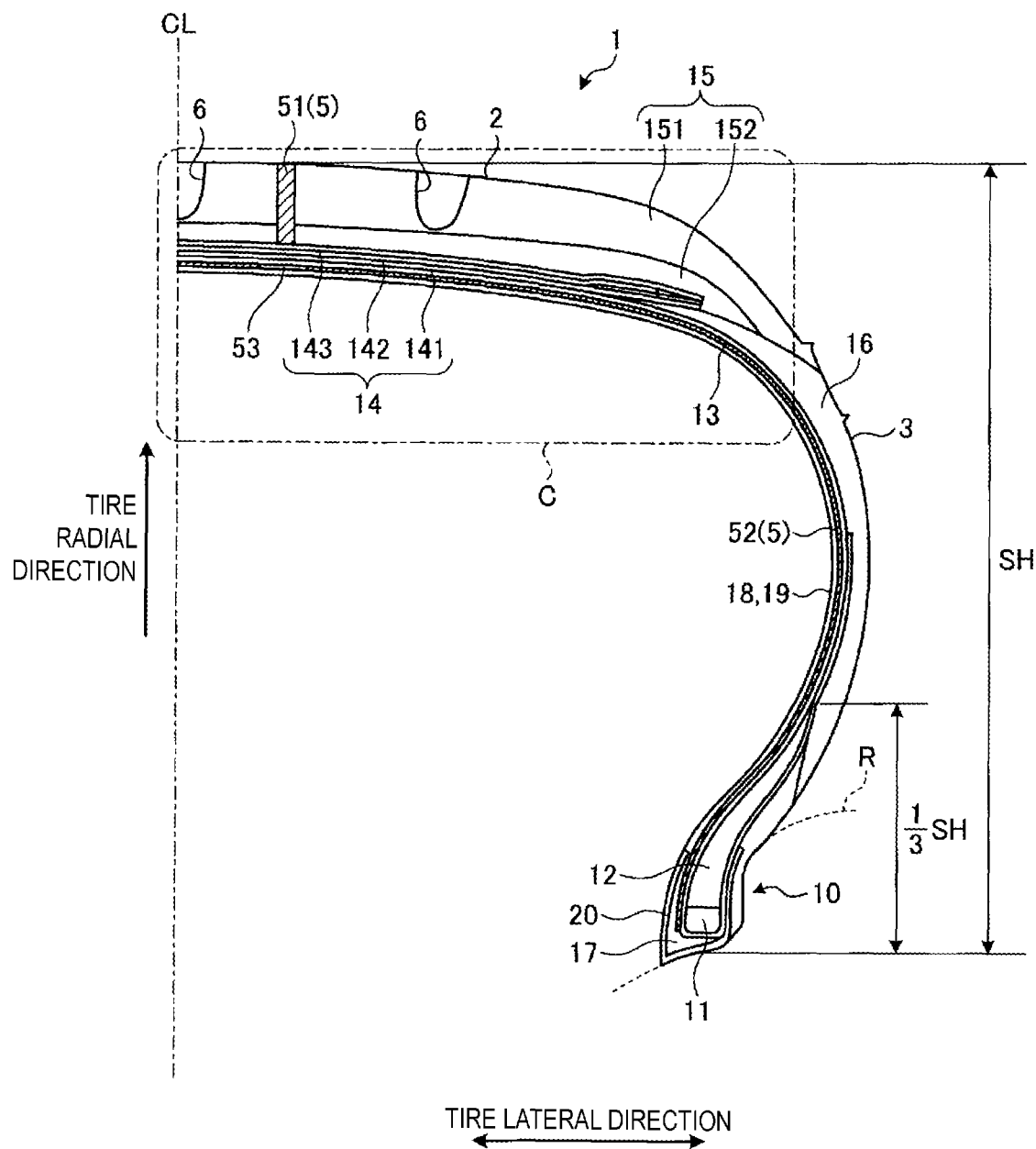
FIG. 9 is a cross-sectional view in a tire meridian direction illustrating a pneumatic tire according to a second embodiment, and is a detailed view of a region on one side across a tire equatorial plane in a tire lateral direction.
Figure 10:
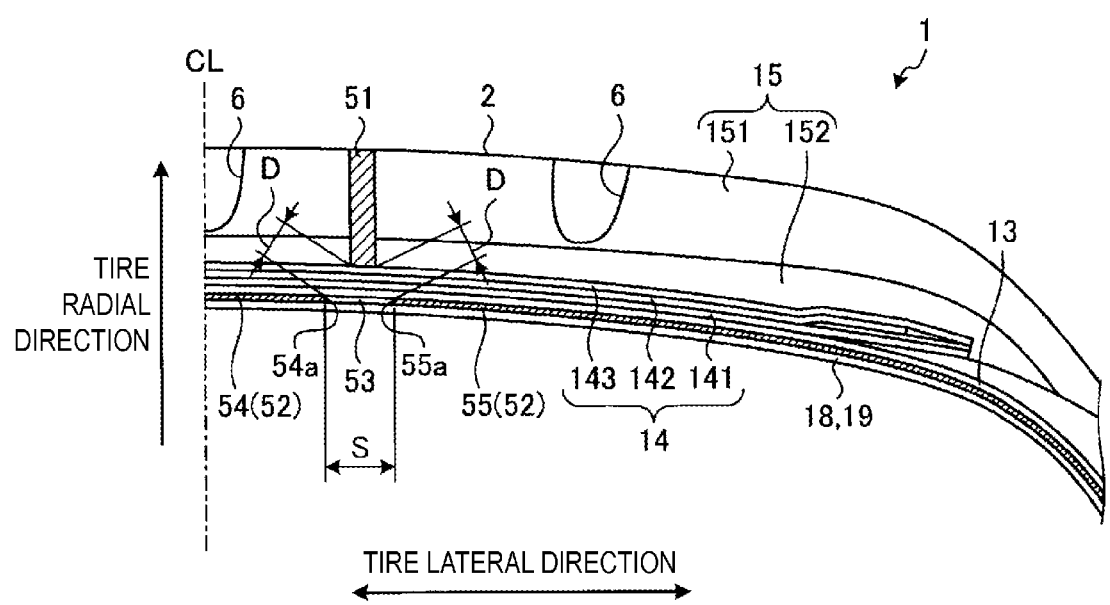
FIG. 10 is a detailed view of portion C of FIG. 9.
Figure 11:
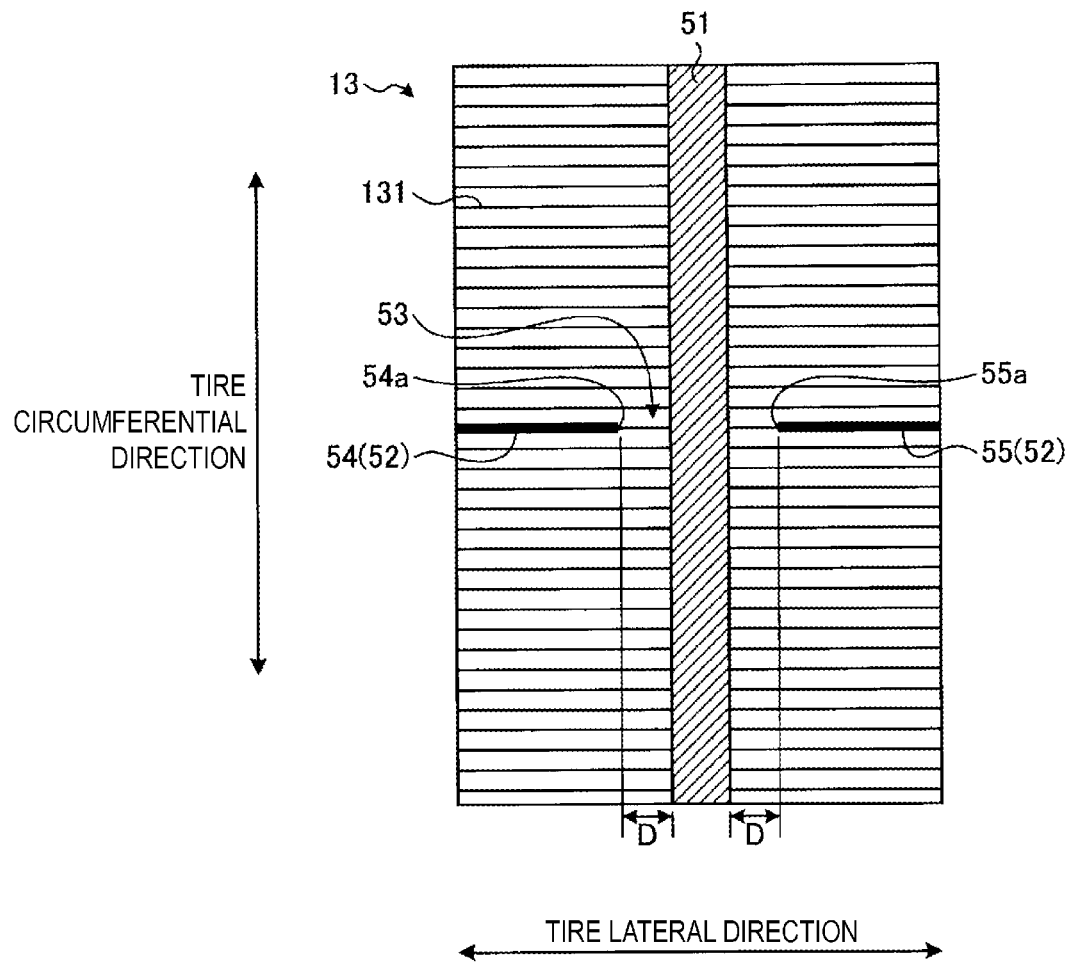
FIG. 11 is a schematic view illustrating a state of spreading the carcass layer illustrated in FIG. 10, and is an explanatory diagram illustrating a relationship between an earthing tread and an electrically conductive portion.

FIG. 9 is a cross-sectional view in the tire meridian direction illustrating the pneumatic tire 1 according to the second embodiment, and is a detailed view of a region on one side across the tire equatorial plane CL in the tire lateral direction. FIG. 10 is a detailed view of portion C of FIG. 9. FIG. 11 is a schematic view illustrating a state of spreading a carcass layer 13 illustrated in FIG. 10, and is an explanatory diagram illustrating a relationship between an earthing tread 51 and an electrically conductive portion 52. As with the pneumatic tire 1 according to the first embodiment, the pneumatic tire 1 according to the second embodiment has an electrostatic suppressing structure 5 including the earthing tread 51 and the electrically conductive portion 52. As with the pneumatic tire 1 according to the first embodiment, the earthing tread 51 is exposed to a road contact surface of a tread rubber 15 and passes through a cap tread 151 and an under tread 152 to come into with the belt layer 14 in an electrically conductive manner. In addition, as with the pneumatic tire 1 according to the first embodiment, the electrically conductive portion 52 is disposed extending between a pair of bead portions 10, 10 along the carcass layer 13.

While the electrically conductive portion 52 is disposed along the carcass layer 13 as with the pneumatic tire 1 according to the first embodiment, a position of the separation portion 53 is different from that of the first embodiment. In the pneumatic tire 1 according to the second embodiment, the separation portion 53 is positioned outside a region between the bead portion 10 and the belt layer 14. Specifically, the separation portion 53 of the electrically conductive portion 52 is positioned inward in the tire radial direction of a member in the belt layer 14, having a widest width in the tire lateral direction, i.e., a belt ply having a widest width in the tire lateral direction of belt plies constituting the belt layer 14, such as cross belts 141, 142 and a belt cover 143. In other words, the separation portion 53 of the electrically conductive portion 52 is disposed at a position within a lateral range where the belt layer 14 is disposed and inward in the tire radial direction of the belt layer 14. In the present second embodiment, a part of the separation portion 53 of the electrically conductive portion 52 in the tire lateral direction overlaps with the earthing tread 51 in the tire lateral direction.

Accordingly, the electrically conductive portion 52 is separated into two members by the separation portion 53, the two members including a first member 54 positioned on one side across the separation portion 53 in the tire lateral direction, and a second member 55 positioned on the other side across the separation portion 53 in the tire lateral direction. The electrically conductive portion 52 includes the separation portion 53 positioned inward in the tire radial direction of the member in the belt layer 14, having the widest width in the tire lateral direction, so at least a part of each of the first member 54 and the second member 55 is positioned at the same position in the tire lateral direction at which the belt layer 14 is disposed. Accordingly, each of the first member 54 and the second member 55 separated by the separation portion 53 is disposed continuously between the corresponding bead portion 10 and the belt layer 14.

The electrically conductive portion 52 is configured such that the separation portion 53 includes end portions 54a, 55a and a distance D between the earthing tread 51 at a position closest to one of the end portions 54a, 55a of the separation portion 53 and the one of the end portions 54a, 55a is in the range D≤50 mm. In other words, the end portion 54a of the first member 54 and the end portion 55a of the second member 55 each have the distance D from the earthing tread 51, being in the range D≤50 mm. The distance D between each of the end portions 54a, 55a of the separation portion 53 and the earthing tread 51 is preferably in the range D≤30 mm, and more preferably in the range D≤10 mm.

As described above, the pneumatic tire 1 according to the second embodiment is configured such that the separation portion 53 of the electrically conductive portion 52 is positioned outside the region between the bead portion 10 and the belt layer 14, so an electrically conductive path between the bead portion 10 and the belt layer 14 can be more reliably ensured. Accordingly, the electrically conductive portion 52 can be provided with the separation portion 53 while the electrically conductive path using the electrostatic suppressing structure 5 is ensured. As a result, the electrically conductive portion 52 can be improved in durability while the electrostatic suppression performance is ensured more reliably.

The separation portion 53 positioned inward in the tire radial direction of the member in the belt layer 14, having the widest width in the tire lateral direction, so at least a part of each of the first member 54 and the second member 55 of the electrically conductive portion 52, separated by the separation portion 53, can be positioned in tire lateral direction at the same position at which the belt layer 14 is disposed. Accordingly, the electrically conductive portion 52 can be disposed continuously between the bead portion 10 and the belt layer 14 in respective regions between the corresponding pair of bead portions 10, 10 and the belt layer 14, and the electrically conductive path between the bead portion 10 and the belt layer 14 can be ensured at positions on both sides in the tire lateral direction in the electrically conductive portion 52. Thus, as compared to a case where the electrically conductive portion 52 is disposed continuously between the bead portion 10 and the belt layer 14 only in one region of the regions between the corresponding pair of bead portions 10, 10 and the belt layer 14, the electrically conductive path between the bead portion 10 and the belt layer 14 doubles, and thus the electrical resistance between the rim R and the road surface can be reduced more reliably. As a result, the electrostatic suppression performance can be more reliably ensured.

The distance D between the earthing tread 51 at a position closest to one of the end portions 54a, 55a of the separation portion 53 and the one of the end portions 54a, 55a is in the range D≤50 mm, so electrical resistance between the electrically conductive portion 52 and the earthing tread 51 can be reduced, and thus the electrical resistance between the rim R and the road surface can be reduced more reliably. As a result, the electrostatic suppression performance can be more reliably ensured.

Modified Examples

Figure 12:
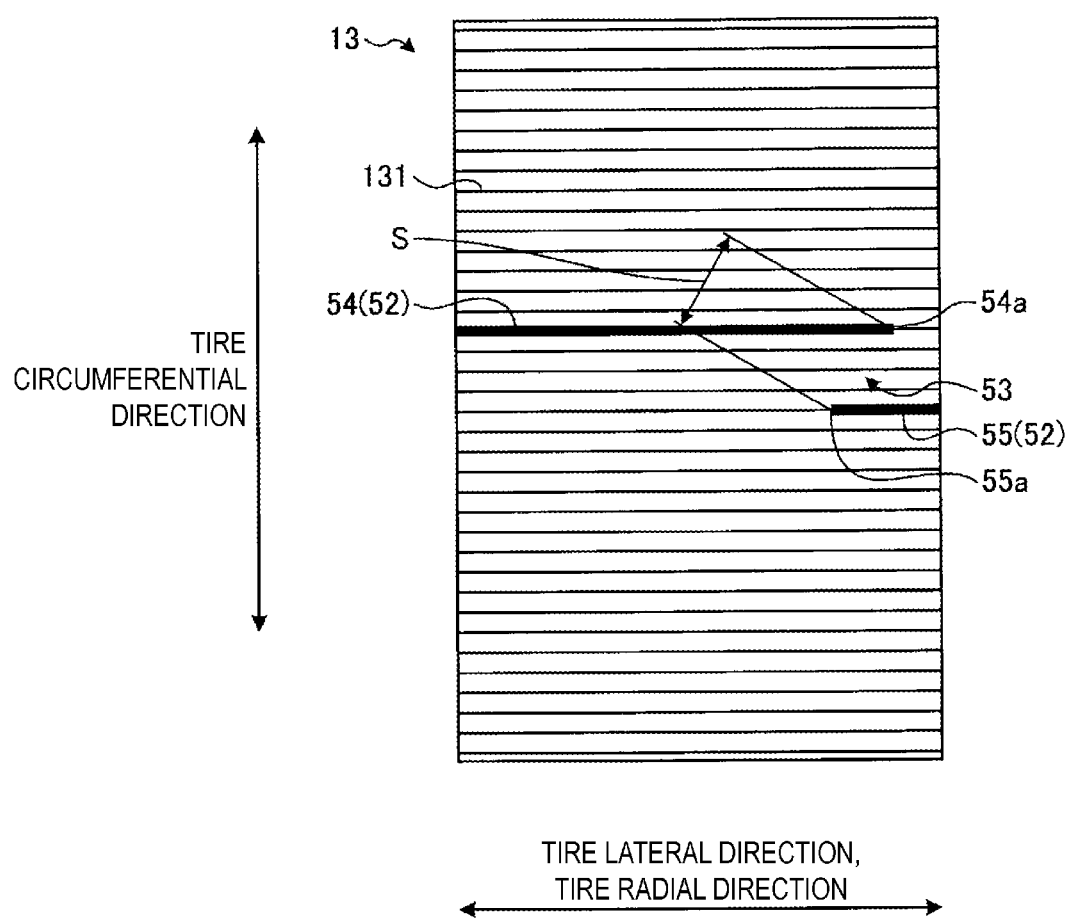
FIG. 12 is an explanatory diagram illustrating a modified example of the pneumatic tire according to the first embodiment, illustrating a state in which a first member and a second member of the electrically conductive portion are displaced from each other.

While in the pneumatic tire 1 according to each of the first and second embodiments, the first member 54 and the second member 55 separated by the separation portion 53 are spaced apart in the extension direction of the electrically conductive portion 52, the first member 54 and the second member 55 may be separated in a direction other than the extension direction of the electrically conductive portion 52. FIG. 12 is an explanatory diagram illustrating a modified example of the pneumatic tire 1 according to the first embodiment, illustrating a state in which the first member 54 and the second member 55 of the electrically conductive portion 52 are displaced from each other. For example, the first member 54 and the second member 55 of the electrically conductive portion 52, separated by the separation portion 53, may be disposed displaced from each other in the tire circumferential direction, as illustrated in FIG. 12. In this case, the first member 54 and the second member 55 may be disposed overlapping with each other in their some portions in the extension direction of the electrically conductive portion 52. In other words, the first member 54 and the second member 55 displaced from each other in the tire circumferential direction may be disposed overlapping with each other in their some portions in the tire radial direction or in the tire lateral direction. Even when the first member 54 and the second member 55 are disposed displaced from each other, the separation portion 53 may have the separation distance S, i.e., the distance S between the end portion 54a of the first member 54 and the end portion 55a of the second member 55, in the range S≤100 mm.

Figure 13:
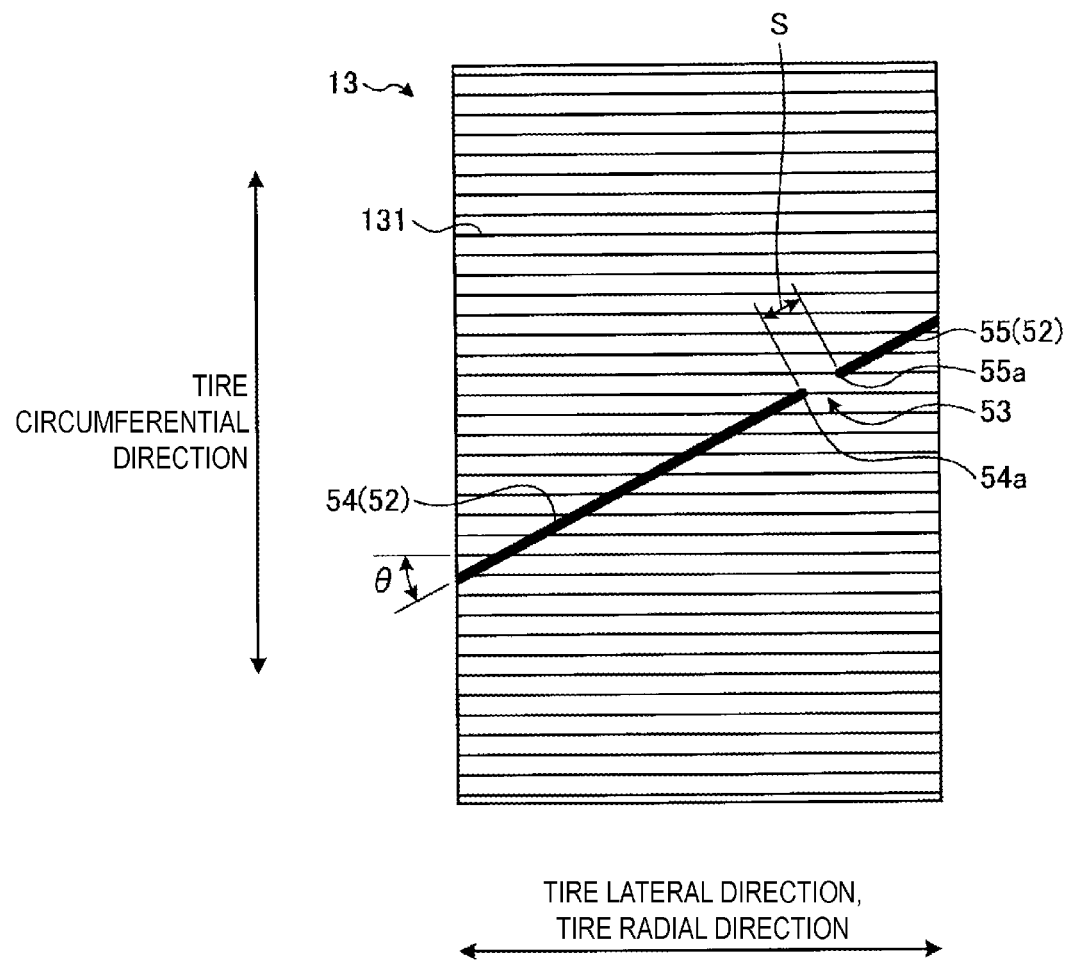
FIG. 13 is an explanatory diagram illustrating a modified example of the pneumatic tire according to the first embodiment, illustrating a state in which an electrically conductive portion is disposed intersecting carcass cords.
Figure 14:
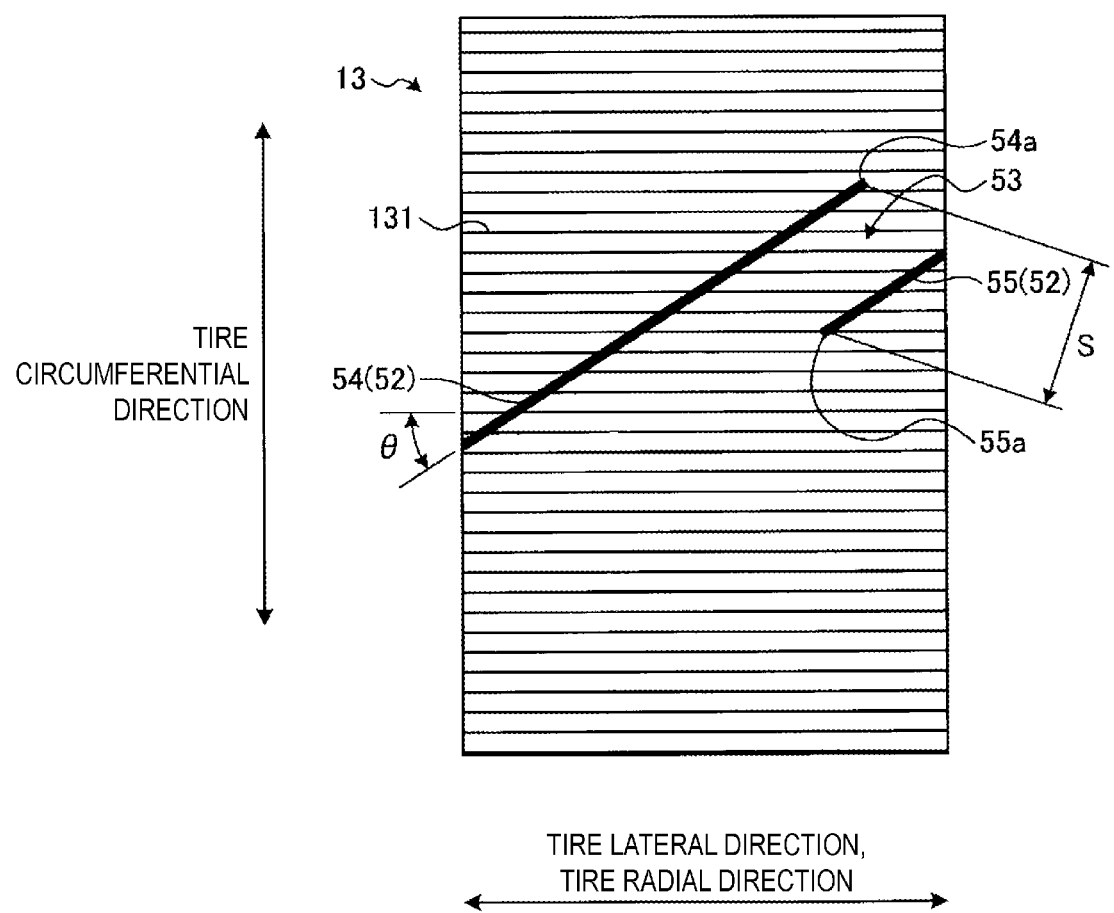
FIG. 14 is an explanatory diagram illustrating a modified example of the pneumatic tire according to the first embodiment, illustrating a state in which an electrically conductive portion is disposed intersecting carcass cords.

While in the pneumatic tire 1 according to each of the first and second embodiments, the electrically conductive portion 52 is disposed in a direction substantially parallel to the carcass cords 131 of the carcass layer 13, the electrically conductive portion 52 may be disposed in a direction other than that parallel to the carcass cords 131. FIGS. 13 and 14 are each an explanatory diagram illustrating a modified example of the pneumatic tire 1 according to the first embodiment, illustrating a state in which the electrically conductive portion 52 is disposed intersecting the carcass cords 131. For example, the electrically conductive portion 52 may be disposed extending in a direction intersecting the carcass cords 131 provided in the carcass layer 13, as illustrated in FIG. 13. In other words, the electrically conductive portion 52 may be disposed inclined in the tire circumferential direction from the tire radial direction or the tire lateral direction while extending in the tire radial direction or the tire lateral direction. When the electrically conductive portion 52 intersects the carcass cords 131, a relative angle θ between the electrically conductive portion 52 and the carcass cords 131, i.e., an inclination angle θ of the electrically conductive portion 52 from the carcass cords 131, is preferably in the range 0 degree≤θ≤60 degrees.

When the electrically conductive portion 52 extends in a direction intersecting the carcass cords 131 of the carcass layer 13, the first member 54 and the second member 55 separated by the separation portion 53 may be disposed displaced from each other in a direction intersecting an extension direction of the electrically conductive portion 52, as illustrated in FIG. 14. In this case, as with the modified example illustrated in FIG. 12, the first member 54 and the second member 55 may be disposed overlapping with each other in their some portions in the extension direction of the electrically conductive portion 52.

When the pneumatic tire 1 deforms as a vehicle travels, tension acts on the carcass layer 13 in an extension direction of the carcass cords 131. Thus, when the electrically conductive portion 52 is disposed parallel to the carcass cords 131, tension more easily acts also on the electrically conductive portion 52 in the extension direction of the electrically conductive portion 52. In this case, even the electrically conductive portion 52 provided with the separation portion 53 may break at a position outside the separation portion 53 when large tension acts repeatedly. In contrast, when the electrically conductive portion 52 extends in a direction intersecting the carcass cords 131, the tension acts in a direction different from the extension direction of the electrically conductive portion 52, and thus large tension is less likely to act on the electrically conductive portion 52. Accordingly, the electrically conductive portion 52 can be prevented from breaking at a position outside the separation portion 53, so the electrically conductive portion 52 can be more reliably improved in durability.

Figure 15:
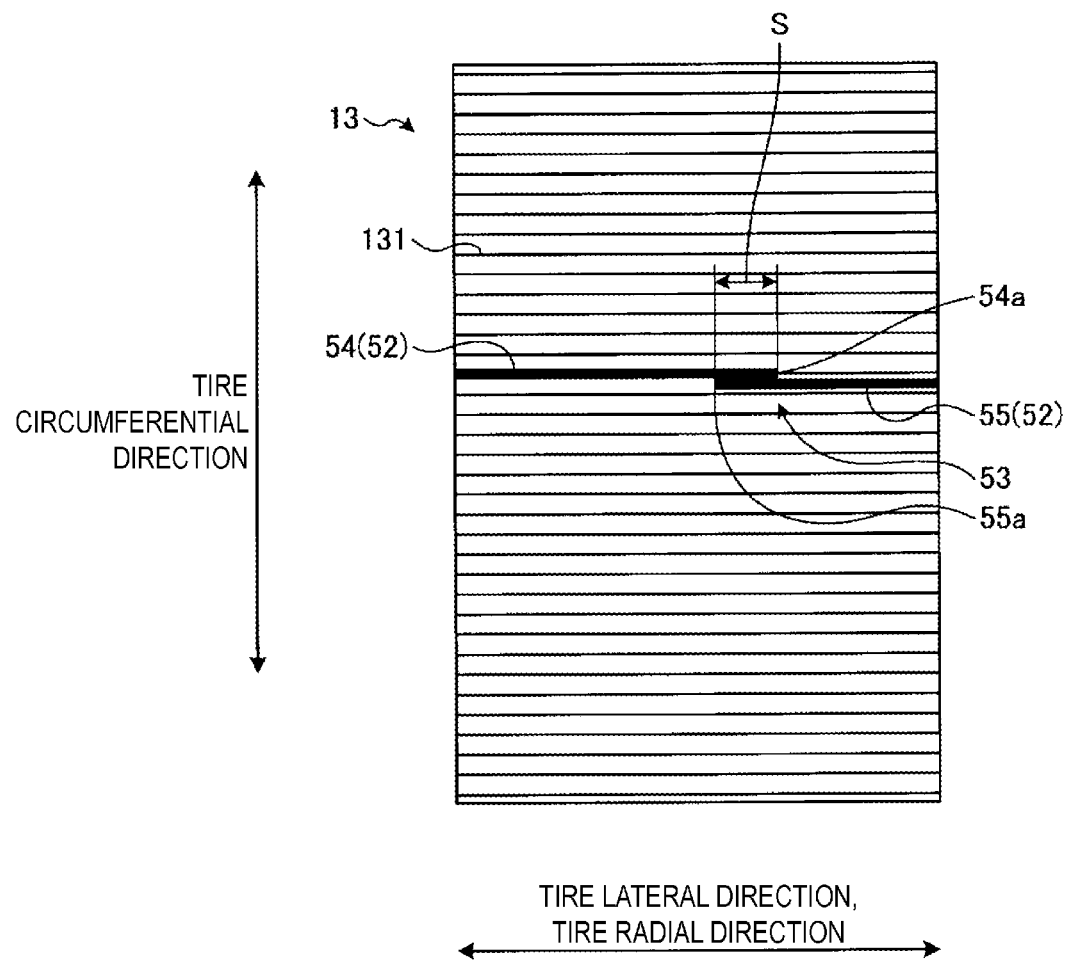
FIG. 15 is an explanatory diagram illustrating a modified example of the pneumatic tire according to the first embodiment, illustrating a state in which a first member and a second member of an electrically conductive portion are disposed in contact with each other.

While in the pneumatic tire 1 according to each of the first and second embodiments, the first member 54 and the second member 55 separated by the separation portion 533 are disposed separated from each other, the first member 54 and the second member 55 may not be separated from each other. FIG. 15 is an explanatory diagram illustrating a modified example of the pneumatic tire 1 according to the first embodiment, illustrating a state in which the first member 54 and the second member 55 of the electrically conductive portion 52 are disposed in contact with each other. The first member 54 and the second member 55 of the electrically conductive portion 52 may be disposed in contact with each other as illustrated in FIG. 15 while being separated by the separation portion 53. Even when the first member 54 and the second member 55 of the electrically conductive portion 52 are disposed in contact with each other, a relative positional relationship between the first member 54 and the second member 55 changes with tension acting on the electrically conductive portion 52. This enables suppressing excessive increase in tensile stress on the electrically conductive portion 52. Accordingly, the electrically conductive portion 52 can be prevented from breaking.

The first member 54 and the second member 55 are in contact with each other, so the first member 54 and the second member 55 are electrically conductive, and thus a region between the bead portion 10 close to an inner end in the tire radial direction of the first member 54 and the belt layer 14, and a region between the bead portion 10 close to an inner end in the tire radial direction of the second member 55 and the belt layer 14, can be each used as an electrically conductive path. Accordingly, the electrically conductive path between the bead portion 10 and the belt layer 14 can be increased, so the electrical resistance between the rim R and the road surface can be reduced more reliably. As a result, the electrostatic suppression performance can be more reliably ensured while the electrically conductive portion 52 is improved in durability.

Figure 16:
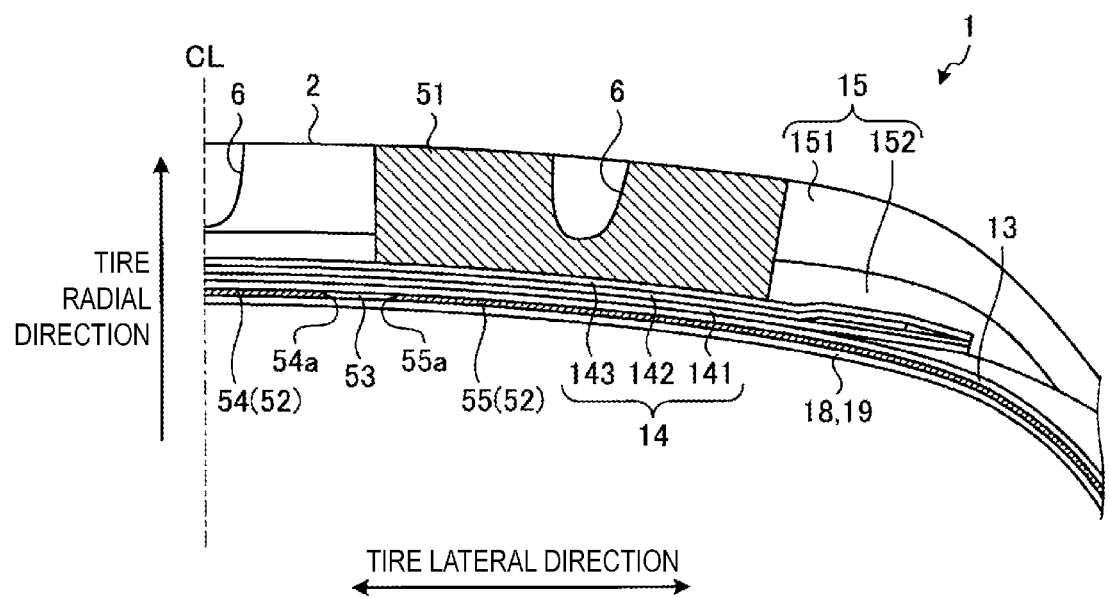
FIG. 16 is an explanatory diagram illustrating a modified example of the pneumatic tire according to the second embodiment, illustrating a state in which an earthing tread is formed across a circumferential main groove.

While in the pneumatic tire 1 according to each of the first and second embodiments, the earthing tread 51 is formed with a width in the tire lateral direction that is narrower than a groove width of the circumferential main grooves 6, and is formed between the adjacent circumferential main grooves 6 in the tire lateral direction, the form of the earthing tread 51 may be other than this. FIG. 16 is an explanatory diagram illustrating a modified example of the pneumatic tire 1 according to the second embodiment, illustrating a state in which the earthing tread 51 is formed across the circumferential main groove 6. As illustrated in FIG. 16, the earthing tread 51 may be formed with a width in the tire lateral direction that is wider than the groove width of the circumferential main groove 6, and may be formed across the circumferential main groove 6 in the tire lateral direction. Even when the earthing tread 51 is formed across the circumferential main groove 6, the earthing tread 51 has an annular structure extending around the entire tire circumference, and a part of the earthing tread 51 continuously extends in the tire circumferential direction while being exposed to the tread tire ground contact surface. Accordingly, the earthing tread 51 has an increased ground contact area, so the electrical resistance between the rim R and the road surface can be reduced more reliably, and the electrostatic suppression performance can be more reliably ensured. On the other hand, when the earthing tread 51 is increased in size, rolling resistance is likely to increase. Thus, the earthing tread 51 is preferably adjusted for width in the tire lateral direction and placement position in the tire lateral direction as appropriate in consideration of a balance between the electrostatic suppression performance and the rolling resistance.

Figure 17:
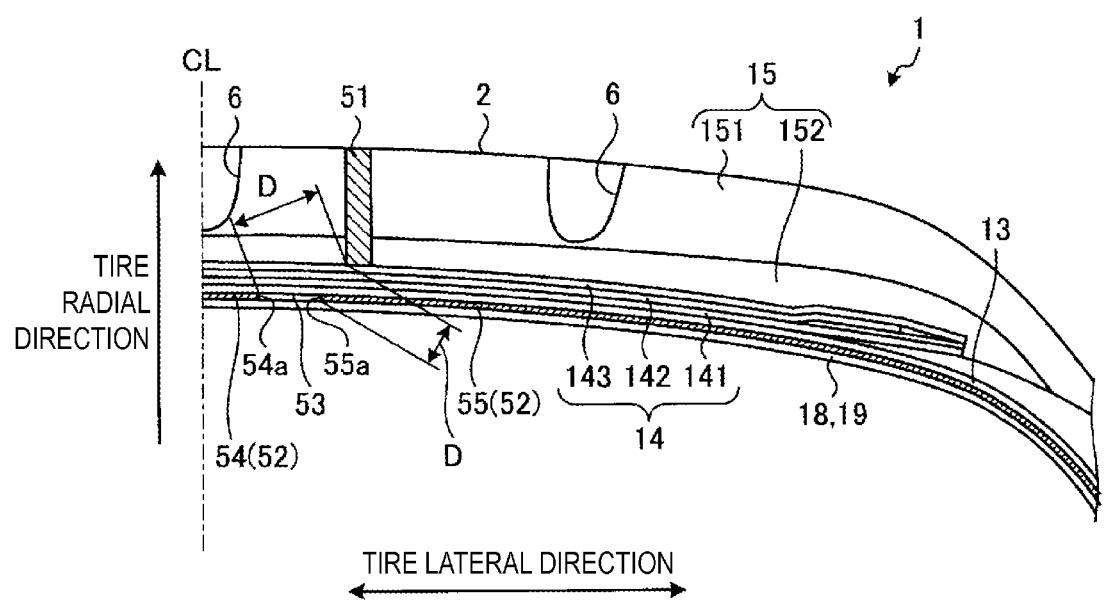
FIG. 17 is an explanatory diagram illustrating a modified example of the pneumatic tire according to the second embodiment, illustrating a state in which a separation portion and an earthing tread do not overlap with each other.
Figure 18:
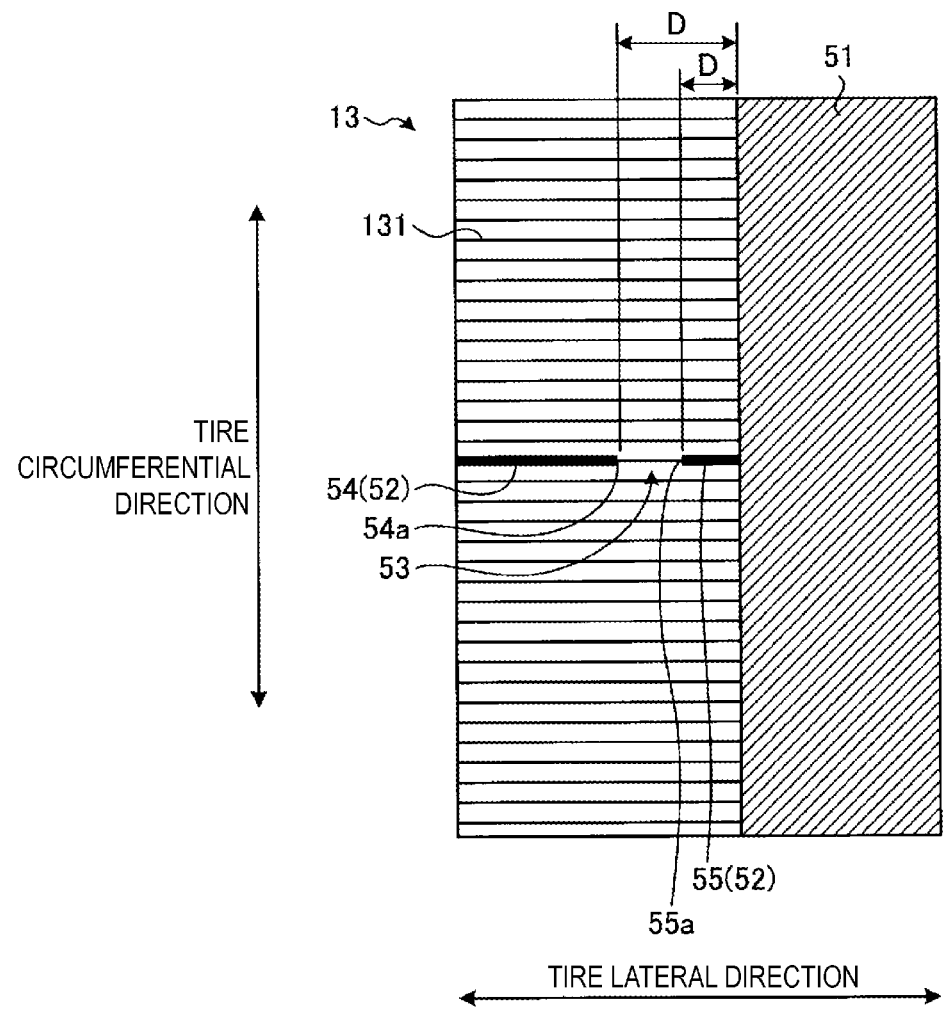
FIG. 18 is an explanatory diagram illustrating a modified example of the pneumatic tire according to the second embodiment, illustrating a state in which a separation portion and an earthing tread do not overlap with each other.

While in the pneumatic tire 1 according to the second embodiment, a part of the separation portion 53 of the electrically conductive portion 52 in the tire lateral direction overlaps with the earthing tread 51 in the tire lateral direction, the separation portion 53 may not overlap with the earthing tread 51 in the tire lateral direction. FIGS. 17 and 18 are each an explanatory diagram illustrating a modified example of the pneumatic tire 1 according to the second embodiment, illustrating a state in which the separation portion 53 and the earthing tread 51 do not overlap with each other. For example, all of the separation portion 53 of the electrically conductive portion 52 in the tire lateral direction may be separated from the earthing tread 51 in the tire lateral direction, as illustrated in FIG. 17. As illustrated in FIG. 18, even when the earthing tread 51 has a width in the tire lateral direction, wider than a groove width of the circumferential main groove 6 as illustrated in FIG. 16, all of the separation portion 53 in the tire lateral direction may be separated from the earthing tread 51 in the tire lateral direction.

Even when the separation portion 53 is separated from the earthing tread 51 in the tire lateral direction, the separation portion 53 may have the end portions 54a, 55a each separated from the earthing tread 51 by a distance D in the range D≤50 mm. In other words, the distance D between the end portion 54a of the first member 54 and the earthing tread 51, and the distance D between the end portion 55a of the second member 55 and the earthing 51, need to be in the range D≤50 mm.

Figure 19:
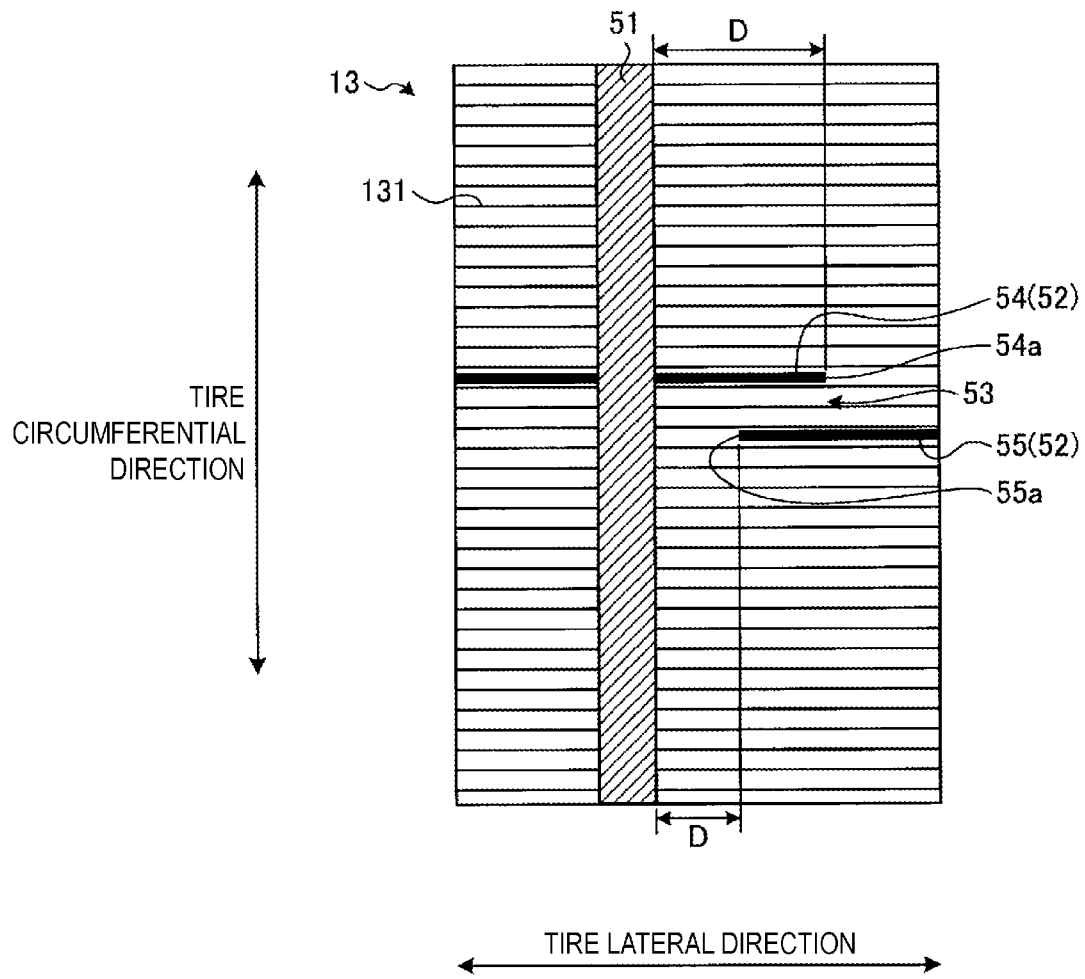
FIG. 19 is an explanatory diagram illustrating a modified example of the pneumatic tire according to the second embodiment, illustrating a state in which a first member and a second member of an electrically conductive portion are displaced from each other.
Figure 20:
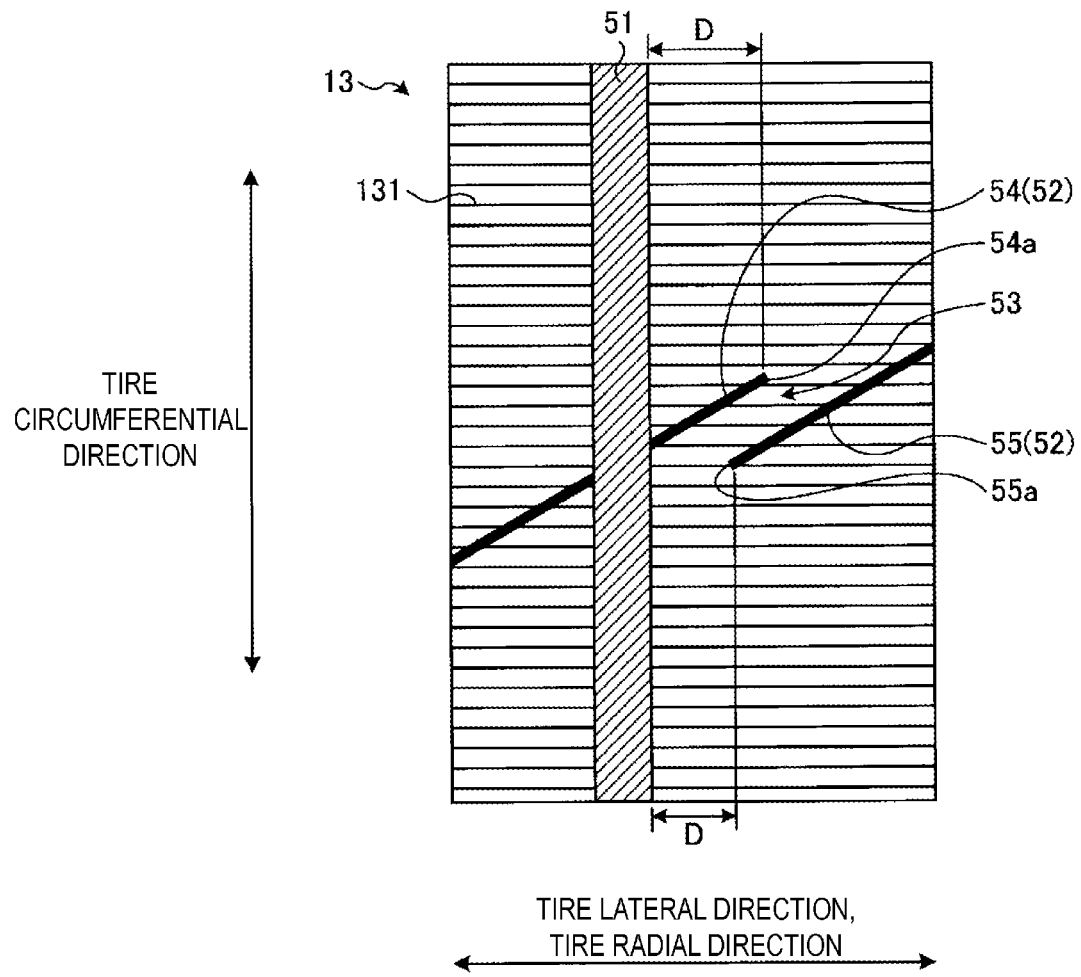
FIG. 20 is an explanatory diagram illustrating a modified example of the pneumatic tire according to the second embodiment, illustrating a state in which an electrically conductive portion is disposed intersecting carcass cords.

FIG. 19 is an explanatory diagram illustrating a modified example of the pneumatic tire 1 according to the second embodiment, illustrating a state in which the first member 54 and the second member 55 of the electrically conductive portion 52 are displaced from each other. FIG. 20 is an explanatory diagram illustrating a modified example of the pneumatic tire 1 according to the second embodiment, illustrating a state in which the electrically conductive portion 52 is disposed intersecting the carcass cords 131. Even when the separation portion 53 is separated from the earthing tread 51 in the tire lateral direction, the electrically conductive portion 52 may include the first member 54 and the second member 55 that are disposed displaced from each other in the tire circumferential direction, as illustrated in FIG. 19. In addition, even when the separation portion 53 is separated from the earthing tread 51 in the tire lateral direction, the electrically conductive portion 52 may extend in a direction intersecting an extension direction of the carcass codes 131 of the carcass layer 13, as illustrated in FIG. 20.

Even when the separation portion 53 is separated from the earthing tread 51 in the tire lateral direction, the electrically conductive portion 52 including the first member 54 with the end portion 54a separated from the earthing tread 51 by a distance D, and the second member 55 with the end portion 55a separated from the earthing tread 51 by a distance D, the distances D each being in the range D≤50 mm. This enables reducing electrical resistance between the electrically conductive portion 52 and the earthing tread 51. As a result, the electrical resistance between the rim R and the road surface can be reduced more reliably, and the electrostatic suppression performance can be more reliably ensured.

While in the pneumatic tire 1 according to each of the first and second embodiments, only one electrically conductive portion 52 is provided, a plurality of the electrically conductive portions 52 may be provided. In this case, the plurality of the electrically conductive portions 52 is preferably disposed at equal intervals in the tire circumferential direction.

When the separation portion 53 is positioned in the region between the bead portion 10 and the belt layer 14 with the plurality of the electrically conductive portions 52, at least one separation portion 53 is preferably disposed on each of the sidewall portions 3, 3 positioned on both sides in the tire lateral direction. In other words, the separation portion 53 is positioned in the region between the bead portion 10 and the belt layer 14 with the plurality of the electrically conductive portions 52, the separation portion 53 is preferably disposed distributed in both the sidewall portions 3, 3 positioned on both sides in the tire lateral direction.

Likewise, when the separation portion 53 is positioned inward in the tire radial direction of the member of the belt layer 14, having the widest width in the tire lateral direction, with the plurality of the electrically conductive portions 52, the separation portion 53 is preferably disposed distributed on both sides across the tire equatorial plane CL in the tire lateral direction.

Examples

FIGS. 21A to 21C are each a table showing results of performance tests of pneumatic tires. Hereinafter, the pneumatic tire 1 described above will be described on performance evaluation tests performed on a pneumatic tire in the related art, the pneumatic tires 1 according to the embodiments of the present technology, and a pneumatic tire of a comparative example to be compared with the pneumatic tires 1 according to the embodiments of the present technology. The performance evaluation tests were performed to evaluate rolling resistance reduction performance, which is performance of a level of rolling resistance of the pneumatic tire 1, and electrostatic suppression performance of the pneumatic tires 1 at new and after test run.

The performance evaluation test was performed using a pneumatic tire having a tire size of 195/65R15 91H specified by JATMA of as a test tire. Evaluation tests for the rolling resistance reduction performance were each performed by measuring rolling resistance of a test tire using an indoor drum type tire rolling resistance tester with a drum diameter of 1707 mm, in accordance with the measurement method defined in JATMA Y/B 2015 edition. The rolling resistance reduction performance is expressed as index values with a reciprocal of rolling resistance of Conventional Example described below being assigned the value of 100. Larger index values indicate less rolling resistance and thus superior rolling resistance reduction performance.

Evaluation tests for the electrostatic suppression performance of the pneumatic tire 1 at new were performed by measuring electrical resistance (Ω) of a test tire using an R8340A ultra-high resistance meter, available from Advanced Testing Co., Ltd., in accordance with measurement conditions specified by JATMA. In addition, evaluation tests for the electrostatic suppression performance after test run were performed by measuring electrical resistance (Ω) of a test tire after running for sixty minutes using the indoor drum type tire rolling resistance tester with a drum diameter of 1707 mm, at an air pressure of 200 kPa, a load of 80% of a specified load, and a speed of 81 km/h. The electrical resistance (Ω) was measured using the R8340A ultra-high resistance meter, available from Advanced Testing Co., Ltd., in accordance with the measurement conditions specified by JATMA. Results of the electrostatic suppression performance at new and after test run indicate that smaller measured numeric values indicate lower electrical resistance and superior electrostatic suppression performance.

The evaluation tests were performed on fourteen types of pneumatic tires of Conventional Example that is an example of a pneumatic tire in the related art, Examples 1 to 12 that are the pneumatic tires 1 according to the corresponding embodiments of the present technology, and Comparative Example that is a pneumatic tire to be compared with the pneumatic tires 1 according to the corresponding embodiments of the present technology. Among them, the pneumatic tire of Conventional Example includes the electrically conductive portion 52 provided with no separation portion 53. The pneumatic tire of Comparative Example includes the electrically conductive portion 52 provided with the separation portion 53, and the electrically conductive portion 52 has an electrical resistivity of $1 \times 10^{\wedge}8$ Ω/cm or more.

In contrast, Examples 1 to 12 are each an example of the pneumatic tires 1 according to the embodiments of the present technology, and each include the conductive portion 52 provided with the separation portion 53, the electrically conductive portion 52 having an electrical resistivity of less than $1 \times 10^{\wedge}8$ Ω/cm. In addition, the pneumatic tires 1 according to Example 1 to 12 are each different in the following: presence/absence of the earthing tread 51; a volume resistivity of each of the earthing tread 51, the cap tread 151, the sidewall rubber 16, and the coating rubber of the carcass layer 13; a value of tan δ at 60° C. of each of the cap tread 151 and the sidewall rubber 16, and a position of the separation portion 53 of the electrically conductive portion 52 (whether it is positioned in the sidewall portion 3 or inward in the tire radial direction of the belt layer 14); a distance between each of the end portions 54a, 55a of the separation portion 53 of the electrically conductive portion 52 and the earthing tread 51; whether the electrically conductive portion 52 is formed by intertwining the electrically conductive linear member 521 and the non-electrically conductive linear member 522 (structure of the electrically conductive portion 52); a total fineness of the electrically conductive portion 52; and an elongation ratio of the electrically conductive portion 52.

As a result of performing the evaluation tests on these pneumatic tires 1, FIGS. 21A to 21C show that the pneumatic tire 1 according to each of Examples 1 to 12 can maintain the electrostatic suppressing performance at new and after the test run to the same level without significantly reducing the electrostatic suppression performance after the test run from the electrostatic suppression performance at new compared to Conventional Example and Comparative Example. In other words, the pneumatic tires 1 according to respective Examples 1 to 12 and the method of manufacturing the pneumatic tires 1 can improve the electrically conductive portion 52 in durability, and can maintain the electrostatic suppression performance.

The invention claimed is:

1. A pneumatic tire comprising:
   a pair of bead portions;
   at least one carcass layer extending between the pair of bead portions;
   a belt layer disposed outward of the carcass layer in a tire radial direction;
   a tread rubber disposed outward of the belt layer in the tire radial direction;
   a pair of sidewall rubbers disposed outward of the carcass layer in a tire lateral direction; and
   an electrically conductive portion extending between the pair of bead portions and having at least one separation portion, the electrically conductive portion having a linear structure,
   the linear structure including an electrically conductive linear member formed in a linear shape by molding an electrically conductive material with an electrical resistivity of less than $1 \times 10^{\wedge}8$ Ω/cm,
   the electrically conductive portion having first and second members separated by the separation portion and disposed displaced from each other in the tire circumferential direction, a separation distance S between end portions of the first and second members being in the range 0 mm<S≤60 mm,
   the electrically conductive portion being formed by intertwining a plurality of linear members including at least the one electrically conductive linear member, and the first member extending from one of the pair of bead portions and the second member extending from an other of the pair of bead portions,
   the first member extending from one of the pair of bead portions and intersecting a tire equatorial plane, and
   the second member extending from an other of the pair of bead portions and terminating without intersecting the tire equatorial plane.

2. The pneumatic tire according to claim 1, wherein the separation portion is positioned outside a region between the bead portion and the belt layer.

3. The pneumatic tire according to claim 1, wherein the electrically conductive portion is disposed continuously between the bead portion and the belt layer in at least one region of regions between the pair of bead portions and the belt layer.

4. The pneumatic tire according to claim 1, wherein the separation portion is positioned inward of the belt layer in the tire radial direction having a widest width in the tire lateral direction of the belt layer.

5. The pneumatic tire according to claim 1, wherein the tread rubber includes a cap tread constituting a tire ground contact surface, an undertread layered inward of the cap tread in the tire radial direction, and an earthing tread having a volume resistivity of less than $1\times10^8$ Ω·cm, the earthing tread passing through at least the cap tread to be exposed to the tire ground contact surface.

6. The pneumatic tire according to claim 5, wherein a distance D between an end portion of the separation portion and a position closest to the end portion of the separation portion in the earthing tread satisfies D≤50 mm.

7. The pneumatic tire according to claim 1, wherein the electrically conductive portion is formed by intertwining the electrically conductive linear member having an electrical resistivity of less than $1\times10^8$ Ω/cm and a non-electrically conductive linear member having an electrical resistivity of $1\times10^8$ Ω/cm or more.

8. The pneumatic tire according to claim 7, wherein the electrically conductive linear member is a metal fiber, and the non-electrically conductive linear member is an organic fiber.

9. The pneumatic tire according to claim 1, wherein the electrically conductive portion is disposed sandwiched between the carcass layer and an adjacent member.

10. The pneumatic tire according to claim 1, wherein coating rubber on the carcass layer has a volume resistivity of $1\times10^8$ Ω·cm or more.

11. The pneumatic tire according to claim 1, wherein the electrically conductive portion has a total fineness of from 20 dtex to 1000 dtex.

12. The pneumatic tire according to claim 11, wherein the electrically conductive portion has an elongation ratio of from 1.0% to 70.0%.

13. The pneumatic tire according to claim 1, wherein the tread rubber includes a cap tread constituting a tire ground contact surface, and an undertread layered inward of the cap tread in the tire radial direction, the cap tread having a value of tan δ at 60° C. of 0.25 or less, and the cap tread having a volume resistivity in the range of $1\times10^8$ Ω·cm or more.

14. The pneumatic tire according to claim 1, wherein the sidewall rubber has a value of tan δ at 60° C. of 0.20 or less, and the sidewall rubber has a volume resistivity in the range of $1\times10^8$ Ω·cm or more.

15. The pneumatic tire according to claim 1, wherein the electrically conductive portion intersects carcass cords provided in the carcass layer.

16. The pneumatic tire according to claim 1, wherein the separation distance S is less than 20 mm.

17. The pneumatic tire according to claim 1, wherein the first and second members overlap in the tire lateral direction.

18. The pneumatic tire according to claim 1, wherein the electrically conductive portion is a single and only electrically conductive portion.

19. A method of manufacturing a pneumatic tire comprising:
a first step of extending an electrically conductive portion between a pair of bead portions when assembling a member constituting a pneumatic tire, the electrically conductive portion having a linear structure, the linear structure including an electrically conductive linear member formed in a linear shape by molding an electrically conductive material with an electrical resistivity of less than $1\times10^8$ Ω/cm;
a second step of making a slit in the electrically conductive portion; and
a third step of separating the slit in the electrically conductive portion by lift before vulcanization to form a separation portion such that end portions of first and second members of the electrically conductive portion separated by the separation portion are disposed displaced from each other in the tire circumferential direction by a separation distance S satisfying 0 mm<S≤100 mm, wherein
the first member extends from one of the pair of bead portions and intersects a tire equatorial plane, and
the second member extends from an other of the pair of bead portions and terminates without intersecting the tire equatorial plane.

20. A pneumatic tire comprising:
a pair of bead portions;
at least one carcass layer extending between the pair of bead portions;
a belt layer disposed outward of the carcass layer in a tire radial direction;
a tread rubber disposed outward of the belt layer in the tire radial direction;
a pair of sidewall rubbers disposed outward of the carcass layer in a tire lateral direction; and
an electrically conductive portion extending between the pair of bead portions and having at least one separation portion disposed in a sidewall region corresponding to one of the sidewall rubbers, the electrically conductive portion having a linear structure,
the linear structure including an electrically conductive linear member formed in a linear shape by molding an electrically conductive material with an electrical resistivity of less than $1\times10^8$ Ω/cm,
the electrically conductive portion has first and second members separated by the separation portion and disposed displaced from each other in the tire circumferential direction,
the first member extending from one of the pair of bead portions and intersecting a tire equatorial plane, and
the second member extending from an other of the pair of bead portions and terminating without intersecting the tire equatorial plane.

21. A pneumatic tire comprising:
a pair of bead portions;
at least one carcass layer extending between the pair of bead portions;
a belt layer disposed outward of the carcass layer in a tire radial direction;
a tread rubber disposed outward of the belt layer in the tire radial direction;
a pair of sidewall rubbers disposed outward of the carcass layer in a tire lateral direction; and
an electrically conductive portion extending between the pair of bead portions and having at least one separation portion, the electrically conductive portion having a linear structure,
the linear structure including an electrically conductive linear member formed in a linear shape by molding an electrically conductive material with an electrical resistivity of less than $1\times10^8$ Ω/cm, and
the electrically conductive portion has first and second members separated by the separation portion and disposed displaced from each other in the tire circumferential direction; wherein
the tread rubber includes a cap tread constituting a tire ground contact surface, an undertread layered inward of the cap tread in the tire radial direction, and an earthing tread having a volume resistivity of less than $1\times10^8$ Ω·cm, the earthing tread passing through at least the cap tread to be exposed to the tire ground contact surface, end portions of the first and second members are arranged on left and right sides of the earthing tread, a distance D between each of the end portions of the first and second members and the earthing tread satisfies D≤30 mm, and the first member extends from one of the pair of bead portions and intersects a tire equatorial plane, and the second member extends from an other of the pair of bead portions and terminates without intersecting the tire equatorial plane.

22. The pneumatic tire according to claim 21, wherein D≤10 mm.

23. A pneumatic tire comprising:

a pair of bead portions;

at least one carcass layer extending between the pair of bead portions;

a belt layer disposed outward of the carcass layer in a tire radial direction;

a tread rubber disposed outward of the belt layer in the tire radial direction;

a pair of sidewall rubbers disposed outward of the carcass layer in a tire lateral direction; and an electrically conductive portion extending between the pair of bead portions and having at least one separation portion, the electrically conductive portion having a linear structure, the linear structure including an electrically conductive linear member formed in a linear shape by molding an electrically conductive material with an electrical resistivity of less than $1\times10^8$ Ω/cm, the electrically conductive portion having first and second members separated by the separation portion and disposed displaced from each other in the tire circumferential direction, a separation distance S between end portions of the first and second members being in the range 0 mm<S≤100 mm, the electrically conductive portion being formed by intertwining a plurality of linear members including at least the one electrically conductive linear member, the first member extending from one of the pair of bead portions and the second member extending from an other of the pair of bead portions, the first and second members overlapping in the tire lateral direction, the first member extending from one of the pair of bead portions and intersecting a tire equatorial plane, and the second member extending from an other of the pair of bead portions and terminating without intersecting the tire equatorial plane.

* * * * *